US006170632B1

(12) United States Patent
Shimura et al.

(10) Patent No.: US 6,170,632 B1
(45) Date of Patent: Jan. 9, 2001

(54) MOVING WALK

(75) Inventors: Toshikazu Shimura, Chiba; Mitsuru Saito, Ageo, both of (JP)

(73) Assignee: Ishikawajima-Harima Jukogyo Kabushiki Kaisha, Tokyo-to (JP)

(*) Notice: Under 35 U.S.C. 154(b), the term of this patent shall be extended for 0 days.

(21) Appl. No.: 09/161,384

(22) Filed: Sep. 28, 1998

(30) Foreign Application Priority Data

| | | |
|---|---|---|
| Oct. 14, 1997 | (JP) | 9-280553 |
| Mar. 17, 1998 | (JP) | 10-066330 |
| Mar. 17, 1998 | (JP) | 10-066331 |
| Mar. 17, 1998 | (JP) | 10-066332 |
| Aug. 11, 1998 | (JP) | 10-226987 |

(51) Int. Cl.[7] .......... B65G 23/00

(52) U.S. Cl. .......... 198/334; 198/792; 198/325; 198/321; 104/25; 104/167

(58) Field of Search .......... 198/321, 325, 198/334, 792; 104/25, 167

(56) References Cited

U.S. PATENT DOCUMENTS

| | | | | |
|---|---|---|---|---|
| 763,204 | * | 6/1904 | Pratt | 198/325 |
| 1,112,836 | * | 10/1914 | Reno | 198/325 |
| 1,298,285 | * | 3/1919 | Bogaty | 104/167 |
| 1,632,569 | * | 6/1927 | Taylor | 104/167 |
| 1,933,554 | * | 11/1933 | Holmes | 104/25 |
| 3,218,986 | * | 11/1965 | Goedkoop | 198/792 |
| 3,811,385 | * | 5/1974 | Johnson et al. | 104/167 |
| 3,842,961 | * | 10/1974 | Burson | 198/334 |
| 3,939,959 | * | 2/1976 | Dunstan et al. | 198/334 |
| 4,197,933 | * | 4/1980 | Dunstan et al. | 198/334 |
| 4,276,976 | | 7/1981 | Dunstan et al. . | |
| 4,444,302 | * | 4/1984 | Dunstan | 198/334 |
| 4,509,429 | * | 4/1985 | De Broqueville | 198/334 |

FOREIGN PATENT DOCUMENTS

| | | |
|---|---|---|
| 56-257 | 1/1981 | (JP) . |
| 58-50909 | 11/1983 | (JP) . |

* cited by examiner

*Primary Examiner*—Robert P. Olszewski
*Assistant Examiner*—Steven B. McAllister
(74) *Attorney, Agent, or Firm*—Oblon, Spivak, McClelland, Maier Neustadt, P.C.

(57) ABSTRACT

The invention relates to a moving walk which can transport users in opposite two directions.

A number of pallets 3 are arranged for rounding or circulation on annular rails 11 having two linear sectors 1A and 1B. Screw rods 16 are arranged on the linear sectors 1A and 1B of the rails 11. The adjacent pallets 3 are interconnected through string members 22. The pallets 3 are moved in opposite directions on the linear sectors 1A and 1B, respectively.

Each pallet 3 is inserted at its front end under a read end of its preceding pallet 3 to provide a continuous walk surface so that many users are transported safely.

6 Claims, 20 Drawing Sheets

MOVING WALK

BACKGROUND OF THE INVENTION

The present invention relates to a moving walk to be installed in public facilities such as airport, railroad station, etc., and in particular to a moving walk for transporting users in two opposite directions.

As one of the moving walks currently in practical use, there is a moving walk which comprises sprockets rotatably mounted on left and right sides of the moving walk at one and the other ends of the moving walk, an endless chain engaged on the sprockets at each of the left and right sides of the moving walk, and a number of pallets on which users can ride and which are engaged at their left and right sides with the endless chains so as to be rounded or circulated by rotation of the sprockets.

In this moving walk, users are transported from one end to the other of the moving walk by the pallets moving along an upper or carrier side of a circulating route whereas the pallets moving along a lower or return side of the circulating route do not contribute to transportation of the users. In the moving walk, users cannot be transported in two opposite directions at the same time.

Another type of moving walk is disclosed in JP-B-56-257.

As shown in FIGS. 1 to 5, the moving walk disclosed in this Japanese publication comprises a guide rail 102 having an accommodation groove 101 extending in an extending direction of the moving walk, guide plates 104 arranged on upper portions of the guide rail 102 at opposite sides of the groove 101, each of the guide plates 104 having at its upper surface a running groove 103 extending in the extending direction of the moving walk, pallets 105 on which users can ride, steel balls 107 rotatably supported via receptacles 106 on left and right bottom portions of the pallets 105 so that the balls 107 can roll along the running grooves 103, and a screw shaft 108 having thread 109 and arranged in the groove 101 to extend in the extending direction of the moving walk.

The screw shaft 108 may be made of bundled steel wires so as to have flexibility.

The screw shaft 108 has portions S and L with shorter and longer pitches in thread 109, respectively. The portions S with shorter pitch are arranged near boarding sites where users can get on or off the pallets, and the portions L with longer pitch are arranged between the boarding sites.

The screw shaft 108 is connected at its one end to a drive shaft of a motor 110 and is rotatably supported at its other end by a bearing 111.

Each of the pallets 105 is formed, at its bottom portions closer to front and rear ends, with grooves 112 extending in the moving direction of the pallet 105, respectively.

Each of the grooves 112 supports an upper portion of a support frame 14 for forward and backward movement of the frame 14 via a shaft 113 extending in the groove 112 in the moving direction of the pallet 105.

Each of the support frames 114 rotatably supports steel balls 115 at its front and rear bottom portions, respectively, so that the steel balls 115 contact the thread 109 of the screw shaft 108.

In this moving walk, actuation of the motor 110 causes the support frames 114 to be pushed in the feed direction of the thread 109 in association with rotation of the screw shaft 108, which moves the pallets 5.

Moving speed of the pallets 105 is slow at the portions S with shorter pitch in thread 109 which are near the boarding sites and increases at the portions L with longer pitch in thread 109 which are between the boarding sites.

In transition of each pallet 105 from the portion S with shorter pitch in the thread 109 to the portion L with longer pitch or vice versa, the frame supports 114 mounted on the pallet 115 are moved horizontally along the shafts 113 so as to adjust spacing between the support frames 114 according to any change of pitch in the thread 109.

Because of its flexibility, the screw shaft 108 may be curved to curve the moving route of the pallets 105.

It may be, therefore, contrived that a number of pallets 105 may be rounded or circulated by substantially annular arrangement of the screw shaft 108 as shown in FIG. 5.

However, in fact, a screw shaft 108 having good flexibility is difficult to produce and therefore is not suitable for practical use. It is not easy to substantially annularly arrange the screw shaft 108 so as to round or circulate the pallets 105.

Furthermore, in the moving walk disclosed in JP-B-56-257, the adjacent pallets 105 in the moving direction are not in contact with each other, and therefore fence or the like means must be provided for each of the pallets 105 so as to prevent users from falling off.

The present invention was made in view of the above and has its object to provide a moving walk which can transport users in two opposite directions at the same time and in safe manner.

BRIEF SUMMARY OF THE INVENTION

In a moving walk according to the invention, a number of pallets are arranged for rounding or circulation on annular rails each having two linear sectors and two semi-circular sectors combined endlessly and substantially horizontally. Screw rods installed on the linear sectors of the rails are rotated to move in one direction the pallets with their moving rollers engaged with screw grooves of the screw rods.

The adjacent pallets are interconnected by string means. The pallets at positions where no screw rods are arranged are pulled by the pallets moved on and by the screw rods.

On the semi-circular sectors of the rails, each pallet is contacted, at its projection member on a lower surface of the pallet, by a front end of its succeeding pallet. The pallets at the semi-circular sectors of the rails are pushed forward by the pallets moved on and by the screw rods on linear sectors of the rails.

Each pallet is inserted, at its front end, under a rear end of its preceding pallet so that a continuous walk surface is formed.

Each pallet may have a recess at its front end, which recess may be fitted over the projection member of its preceding pallet. This ensures positive engagement of a rear end of each pallet with a front end of its succeeding pallet on the semi-circular sectors of the rails.

The screw rods may be arranged on portions of the linear sectors of the rails closer to the circular sectors, pitch of screw groove on the screw rods being shorter on their portions closer to the circular sectors of the rails and longer on their portions away from the circular sectors of the rails. This decreases the moving speed of the pallets on portions of the linear sectors of the rails closer to the circular sectors, and increases the moving speed of the pallets on the middles of the linear sectors of the rails.

Further screw rods for moving pallets may be separately arranged at the middles the linear sectors of the rails to reduce tensile force to be applied on the string means interconnecting the adjacent pallets.

Each pallet may be provided with tilt-angle compensation rollers rollable over lower surfaces of guide rails, which rollers forwardly tilt the pallet moved from the linear sectors of the rails to the semi-circular sectors so that the rear end of the pallet jumps away from the front end of its succeeding pallet. The rollers release the forward tilting of the pallet moved from the semi-circular sectors of the rails to the linear sectors so that the rear end of the pallet is overlapped with the front end of its succeeding pallet.

Steps may be arranged on boarding sites where users may get on or off the pallets. Each of such steps has comb teeth which may be fitted into grooves extending longitudinally on an upper surface of each pallet to remove any foreign objects in the grooves of the pallet.

The step may be vertically movably supported. Tracer means may be provided to vertically move the step in accordance with the upper surface of the pallet passing near the position where the step is arranged. This prevents the comb teeth from contacting bottoms of the grooves of the pallet.

Elastic buffer means may be provided between each pallet and the string means to be connected to the pallet so as to reduce tensile force to be applied to the string means when its succeeding pallet is moved after the pallet.

A short linear sector may be provided at a middle of each of the semi-circular sectors of the rails to increase distance between the long linear sectors of the rails.

DETAILED DESCRIPTION OF THE PREFERRED EMBODIMENTS

Figure 1:
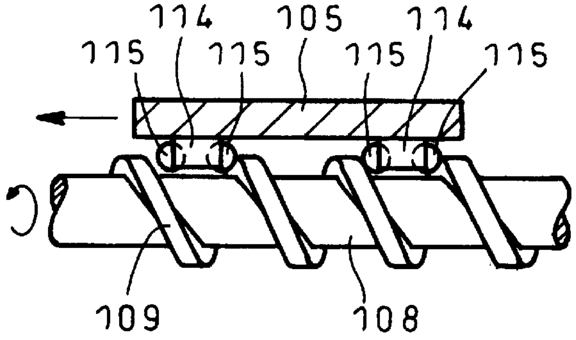
FIG. 1 PRIOR ART
FIG. 1 is a partially sectional side view showing a pallet engaged with a screw shaft of a moving walk disclosed in JP-B-56-257.
Figure 2:
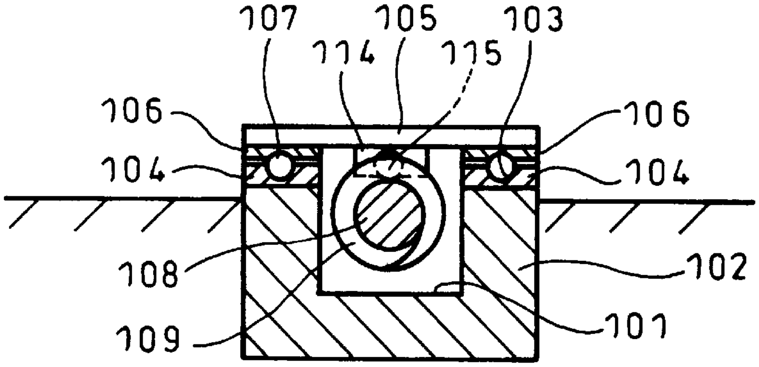
FIG. 2 PRIOR ART
FIG. 2 is a front view partially in section of FIG. 1.
Figure 3:
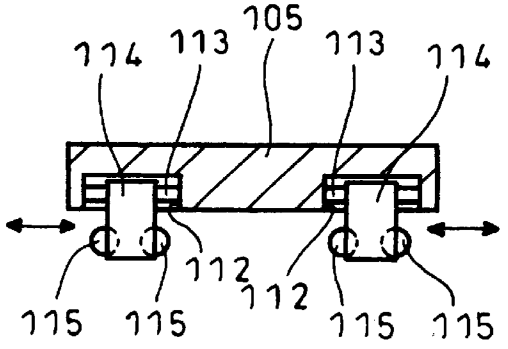
FIG. 3 PRIOR ART
FIG. 3 is a partially sectional side view showing support frames mounted on the pallet of FIG. 1.
Figure 4:
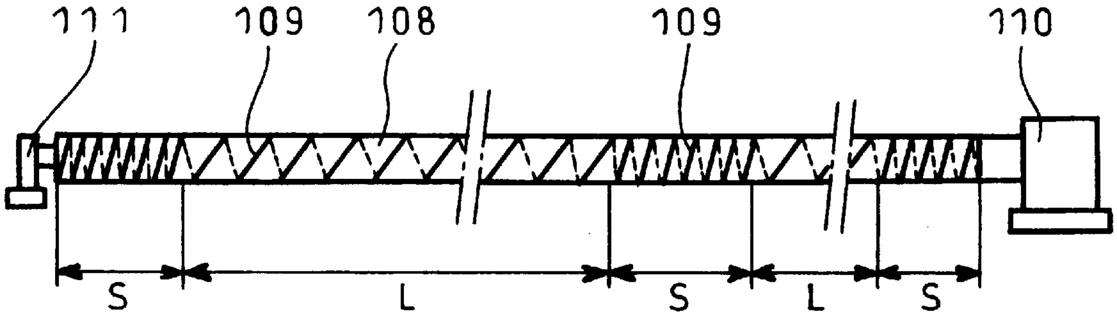
FIG. 4 PRIOR ART
FIG. 4 is a side view showing the whole of the screw shaft of FIG. 1.
Figure 5:
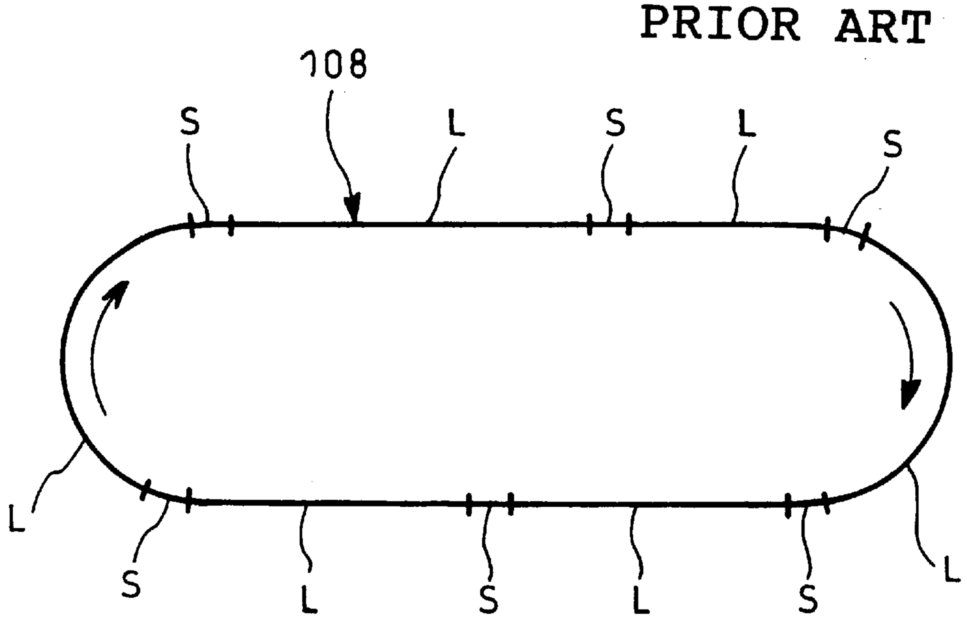
FIG. 5 PRIOR ART
FIG. 5 is a plan view showing the screw shaft of FIG. 1 arranged substantially annularly.

Embodiments of the invention will be described with reference to the attached drawings.

FIGS. 6 to 25 show an embodiment of a moving walk according to the invention which comprises two annularly arranged rails 11, a number of pallets 3 on which users can ride and which can be rounded or circulated along the rails 11, chains 22 and elastic buffer means 25 for interconnecting the adjacent pallets 3, screw rods 16 and 24 for moving the pallets 3 in extending direction of the rails 11, movable steps 63 each positioned at a boarding site where users get on or off the pallets 3, and tracer means 68 capable of vertically moving the corresponding movable step 63 for engagement with an upper surface of the pallet 3.

First, the rails 11 and guide rails 12 in association with them will be described with reference to FIGS. 6 to 10 and 15.

Each of the rails 11 comprises two linear sectors 1A and 1B arranged horizontally in parallel with each other, a semi-circular sector 1C connected to one end of each of the linear sectors 1A and 1B and a semi-circular sector 1D connected to the other end of each of the linear sectors 1A and 1B.

The rails 11 are placed on racks 23 which in turn are installed on base stands 14.

Height of an upper or roller-rolling surface of each of the rails 11 from the base stands 14 is set substantially evenly.

Arranged outside and inside of the semi-circular sectors 1C and 1D of the radially outward and inward rails 11, respectively, are guide rails 12 which are semi-circularly curved in accordance with the rails 11.

The guide rails 12 are supported from above by pillars 13 erected on the base stand 14 at sides of the guide rails 12 away from the rails 11.

Height of a lower or roller-rolling surface of the guide rails 12 from the base stand 14 is set substantially evenly.

The semi-circular sectors 1C and 1D of the rails 11 and the guide rails 12 are entirely covered with boarding platforms 2A and 2B, respectively.

Next, the pallets 3 and members associated with them will be described with reference to FIGS. 8 to 15.

Each pallet 3 has ridges 3*g* on its upper surface. The ridges 3*g* define through grooves 3*f* which extend entirely of the upper surface of the pallet in the moving direction. The ridges 3*g* on the pallet 3 project backwardly to provide comb teeth 3b.

Provided between the comb teeth 3*b* are downward projections 3*e* for engagement with the grooves 3*f* of the succeeding pallet 3. The comb teeth 3*b* have inclined upper surfaces 3*d* which gradually go down backwardly with gentle downward gradient.

Each pallet 3 has a cylindrical projection member 3*c* fixed to a lower surface of the pallet. The pallet 3 is notched at its front end to provide a semi-circular recess 3*a* into which the projection member 3*c* of the preceding pallet 3 may be fitted.

The pallet 3 has a lateral beam 5 attached via a spacer 4 to the lower surface of the pallet and extending laterally of the pallet.

The beam 5 has running rollers 6 each mounted via a bracket 7 on a lower surface of the beam closer to its rear end so that the rollers 6 can roll over the upper surfaces of the rails 11.

Arms 8 substantially L shaped when seen from front or back in the moving direction of the pallet 3 are attached at their upper ends to opposite sides of a front end of the beam 5, respectively. The arm 8 has a tilt-angle compensation roller 10 mounted via a bracket 9 to a lower end of the arm 8 so that the roller 10 can roll over a lower surface of the guide rail 12.

The beam 5 has two arms 15 attached at their upper ends to a lower surface of the beam 5 so as to be positioned between the paired running rollers 6. Each arm 15 has a traverse-motion control roller 21 mounted to a lower end of the arm 15 so that the rollers 21 can roll over opposite sides of the rails 11.

The pallets 3 as described above are arranged such that the running rollers 6 contact the upper surfaces of the rails 11 and the traverse-motion control rollers 21 contact the sides of the rails 11.

Each pallet 3 is inserted, at its front end, under its preceding pallet 3.

As a result, on the linear sectors 1A and 1B of the rails 11, the projections 3*e* of each pallet 3 is engaged with the grooves 3*f* of its succeeding pallet 3. That is, the rear end of the pallet 3 is supported by its succeeding pallet 3.

In transition from the linear sectors 1A or 1B to the semi-circular sectors 1D or 1C of the rails 11, the tilt-angle compensation rollers 10 begin to roll over the lower surfaces of the guide rails 12 to forwardly tilt the pallet 3 so that the rear end of the pallet 3 jumps away from the forward end of its succeeding pallet 3 and the projections 3*e* of the pallet 3 are disengaged from the grooves 3*f* of its succeeding pallet 3, which enables the pallets 3 to pass along the semi-circular sectors 1D or 1C.

On the semi-circular sectors 1D or 1C, the projection member 3*c* of each pallet 3 is fitted in the recess 3*a* on the front end of its succeeding pallet 3.

In transition from the semi-circular sectors 1C or 1D to the linear sectors 1A or 1B of the rails 11, the tilt-angle compensation rollers 10 cease rolling over the lower surfaces of the guide rails 12 to release the forward tilting of each pallet 3 so that the rear end of the pallet 3 is overlapped with the forward end of its succeeding pallet 3 and the projections 3*e* of the pallet 3 are re-engaged with the grooves 3*f* of its succeeding pallet 3.

Next, the screw rods 16 and 24 and drive mechanisms associated with them will be described with reference to FIGS. 6 to 10 and 15 to 20.

The screw rods 16 are arranged at four positions, i.e., at portions of the linear sectors 1A and 1B of the rails 11 closer to the semi-circular sectors 1C and 1D. The screw rods 16 are between and in parallel with the rails 11.

Each screw rod 16 is rotatably supported at its ends by bearings 20 installed on the above-mentioned racks 23.

Screw groove 16*a* of the screw rod 16 is designed such that the pitch becomes longer in the order of S1, M1 and L1 in which S1 refers to a boarding (getting on and off) section closer to the semi-circular sectors 1C or 1D; M1, a low-speed section adjacent to the boarding section S1 and closer to the middle of the linear sectors 1A or 1B; and L1, a high-speed section adjacent to the low-speed section M1 and closer to the middle of the linear sectors 1A or 1B.

Each of the screw rods 16 arranged on the linear sectors 1A closer to the semi-circular sectors 1D and on the linear sectors 1B closer to the semi-circular sectors 1C is associated with a motor 19 through a rotation shaft 34 connected to the motor 19, a sprocket 35 fitted over the shaft 34, a drive chain 36 stretched over the sprocket 35 and another sprocket 37 over which the chain 36 is stretched, so that rotating power of the motor 19 is transmitted.

Each of the screw rods 16 arranged on the linear sectors 1A closer to the semi-circular sectors 1C and on the linear sectors 1B closer to the semi-circular sectors 1D is associated with the motor 19 through a gear box 38 connected to the shaft 34, rotation shafts 39, 40 and 41 sequentially connected to the gear box 38, a gear box 42 connected to the shaft 41, a rotation shaft 43 connected to the gear box 42, a sprocket 44 fitted over the shaft 43, a drive chain 45 stretched over the sprocket 44, another sprocket 46 over which the chain 45 is stretched and a rotation shaft 47 over which the sprocket 46 is fitted, so that rotating power of the motor 19 is transmitted.

The screw rods 24 are arranged at two points, i.e., at middles in the linear sectors 1A and 1B of the rails 11. The screw rods 24 are between and in parallel with the rails 11.

The screw rods 24 is also rotatably supported via bearings (not shown) on the above-mentioned racks 23 just like the screw rods 16.

Screw groove 24*a* of the screw rod 24 has a pitch equal to the pitch of the screw groove 16*a* in the high-speed section L1.

The screw rod 24 positioned at the middle of the linear sectors 1B is associated with a motor 48 through a rotation shaft 49 connected to the motor 48, a sprocket 50 fitted over the shaft 49, a drive chain 51 stretched over the sprocket 50 and another sprocket 52 over which the chain 51 is stretched, so that rotating power of the motor 48 is transmitted.

The screw rod 24 arranged at the middle of the linear sectors 1A is associated with the motor 48 through a gear box 53 connected to the shaft 49, rotation shafts 54, 55 and 56 sequentially connected to the gear box 53, a gear box 57 connected to the shaft 56, a rotation shaft 58 connected to the gear box 57, a sprocket 59 fitted over the rotation shaft 58, a drive chain 60 stretched over the sprocket 59, another sprocket 61 over which the chain 60 is stretched and a rotation shaft 62 over which the sprocket 61 is fitted, so that the rotating power of the motor 48 is transmitted.

The lateral beam 5 of the pallet 3 has a support base 17 attached to a center of a lower surface of the beam 5. The support base 17 has a moving roller 18 rotatably mounted on a lower end of the base 17 such that the roller 18 is positioned just under the projection member 3*c*.

With the moving rollers 18 being engaged with the screw grooves 16*a* and 24*a*, the screws rods 16 and 24 are rotated so that the moving rollers 18 are sent in a direction corresponding to the rotation of the screw rods 16 and 24. As a result, the pallets 3 are moved along the linear sectors 1A and 1B of the rails 11.

Moving speed of the pallets 3 is increased in the order of the boarding section S1, the low-speed section M1 and the high-speed section L1 in accordance with the pitches of the screw grooves 16*a* and 24*a*.

Next, the chain 22 and the elastic buffer means 25 will be described with reference to FIGS. 10, 15, 21 and 22.

The elastic buffer means 25 comprises a spring member 29 loosely fitted over a bolt 28 and capable of being compressed in the moving direction of the pallet 3, a first seat 27*a* axially movably fitted over a portion of the bolt 28 closer to one end of the bolt 28 and in contact with one end of the spring member 29, a first nut 28*a* screwed on the bolt 28 so that it contacts an end surface of the seat 27*a* away from the spring member 29, a second seat 26*a* axially movably fitted over a portion of the bolt 28 closer to the other end of the bolt 28 and in contact with the other end of the spring member 29, a second nut 28*b* screwed on the bolt 28 so that it contacts an end surface of the seat 26*a* away from the spring member 29 and a third nut 28*c* screwed on the bolt 28 so that it contacts the second nut 28*b*.

In the elastic buffer means 25, engagement of the second nut 28*b* with the bolt 28 is adjusted to change projection length of the bolt 28 from the second seat 26*a*.

The first seat 27*a* is integral with an inner tube 27 which is positioned inwardly of the spring member 29 and which encircles an intermediate portion of the bolt 28. The second seat 26*a* is integral with an outer tube 26 which encircles the spring member 29.

The outer tube 26 has a plug 30 fitted into an end of the tube 26 away from the seat. The plug 30 has a connection fork 30*a* and is retained in the tube 26 via a spring pin 30*b*.

The fork 30*a* is connected to one end of a link member 32 via a pin 32*a*.

The other end of the link member 32 is connected to a front end of a bracket 31 fixed to the above-mentioned arm 8 via a substantially horizontal pin 32*b*.

The other end of the bolt 28 is integrally formed with a fork 28*d*.

The fork 28*d* is connected to a rear end of the chain 22 via a pin 22*a*. A front end of the chain 22 is connected to a rear end of the above-mentioned bracket 31 via a substantially horizontal pin 22*b*.

As a result, each of the arms 8 of each pallet 3 is connected to the corresponding one of the arms 8 of its succeeding pallet 3 via the bracket 31 on the pallet 3, the chain 22, the elastic buffer means 25 and the bracket 31 on the succeeding pallet 3.

Further, fixed to the outer tube 26 is a stopper member 33 which contact the fork 28*d* to prevent the bolt 28 from being rotated.

Next, the movable step 63 and the tracer means 68 will be described with reference to FIGS. 14 and 23 to 25.

The movable step 63 is mounted on each of fixed steps 64 associated with the boarding platforms 2A and 2B.

The fixed steps 64 are positioned to extend from the platforms 2A or 2B to cover the ends of the linear sectors 1A or 1B of the rails 11.

The movable step 63 is formed at its tip end with comb teeth 65 to be fitted into the grooves 3*f* on the upper surface of the pallet 3. The movable step 63 has a rotation shaft 66 attached to a base end of the step 63. The rotation shaft 66 projects laterally from the base end of the step 63 substantially horizontally.

This rotation shaft 66 is rotatably supported by a bearing 67 arranged near a tip end of the fixed step 64 such that an upper surface of the base end of the movable step 63 is not greatly distanced from or stepped with an upper surface of the tip end of the fixed step 64.

The tracer means 68 comprises an upper arm 69 having a base end fixed to the shaft 66 and a tip end positioned laterally of the movable step 63, a lower arm 72 having a base end pivoted via a pin 71 to a bracket 70 arranged near the tip end of the movable step 63 and a tip end arranged under the upper arm 69 so as to be positioned closer to the circular sectors 1C or 1D of the rails 11 than the rotation shaft 66, a tracing roller 73 pivotally supported on the tip end of the lower arm 72 so that the roller 73 can roll over the upper surface of the pallet 3 passing immediately below the fixed step 64, and a connecting member 76 with its one end pivoted via a pin 74 to the tip end of the upper arm 69 and with its other end pivoted via pin 75 to an intermediate portion of the lower arm 72.

Distance from the comb teeth 65 of the movable step 63 to center of rotation of the tracing roller 73 is set to a value substantially equal to distance between two adjacent pallets which are going to pass immediately below the movable and fixed steps 63 and 64.

Distance between the pins 74 and 75 is set to such a value that the comb teeth 65 are fitted in the grooves 3*f* of the pallet passing immediately under the movable step 63 and the lower surface of the comb teeth 65 do not contact the bottom of the grooves 3*f*.

Figure 8:
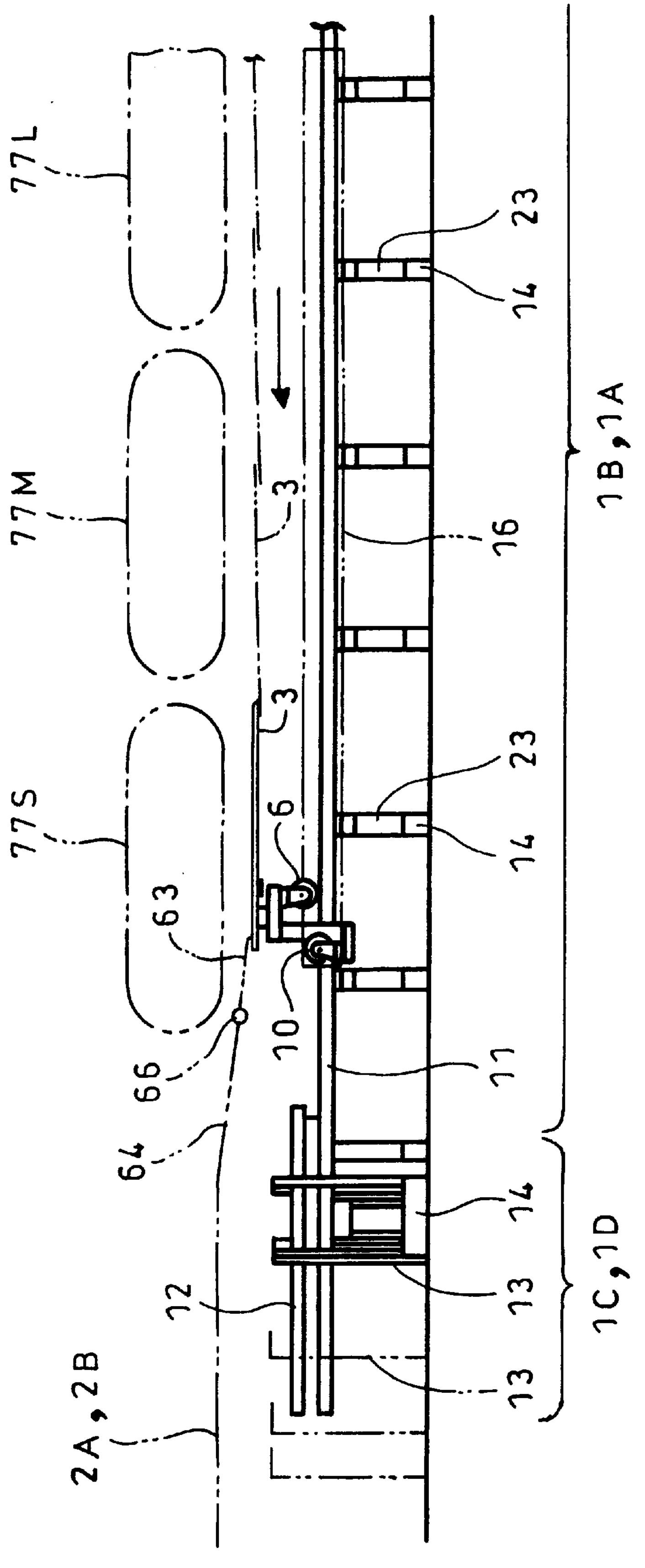
FIG. 8 is a partial side view showing the moving walk according to the embodiment of the invention.
Figure 9:
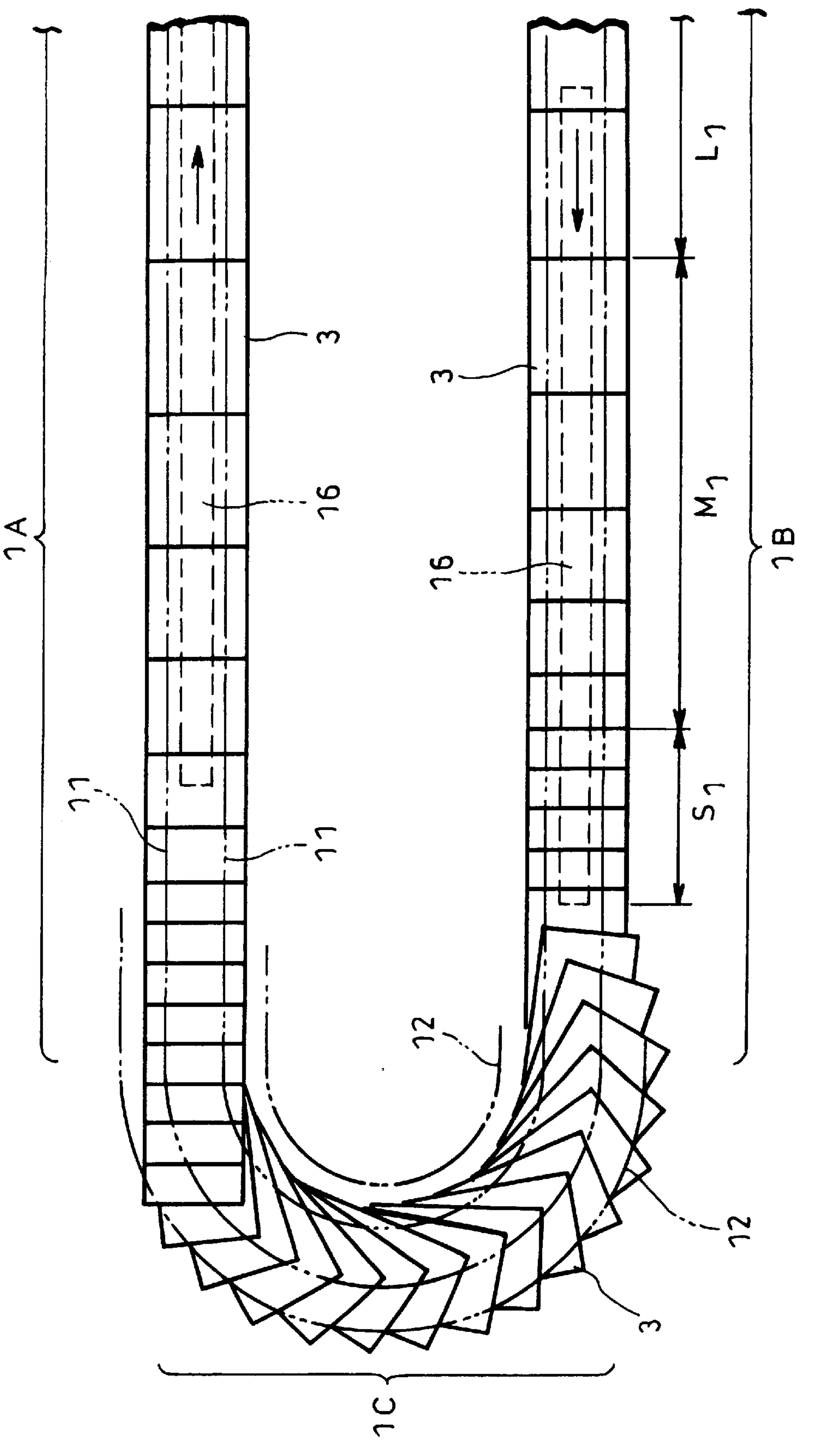
FIG. 9 is a partial plan view showing the pallets in FIG. 8.
Figure 10:
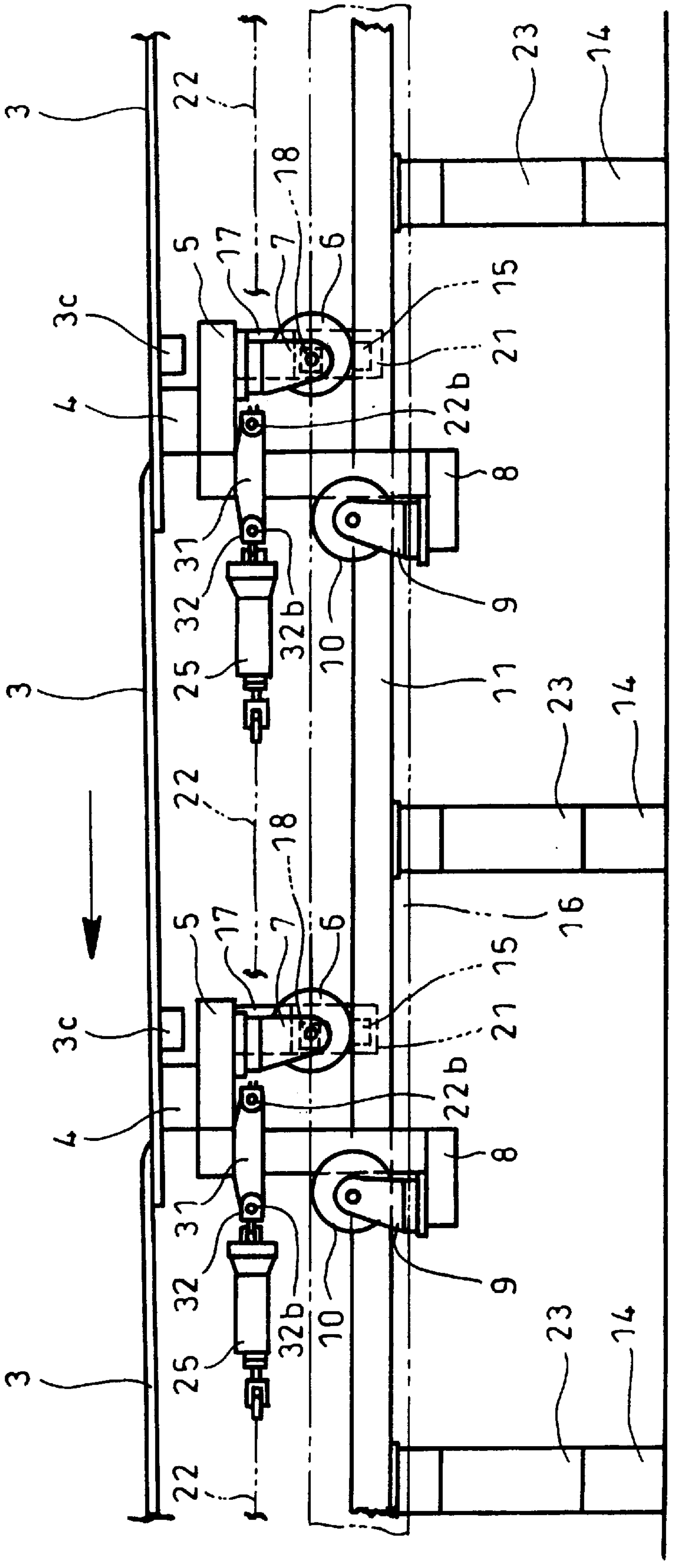
FIG. 10 is a side view showing the pallets on linear sectors of the rails in FIG. 9.
Figure 11:
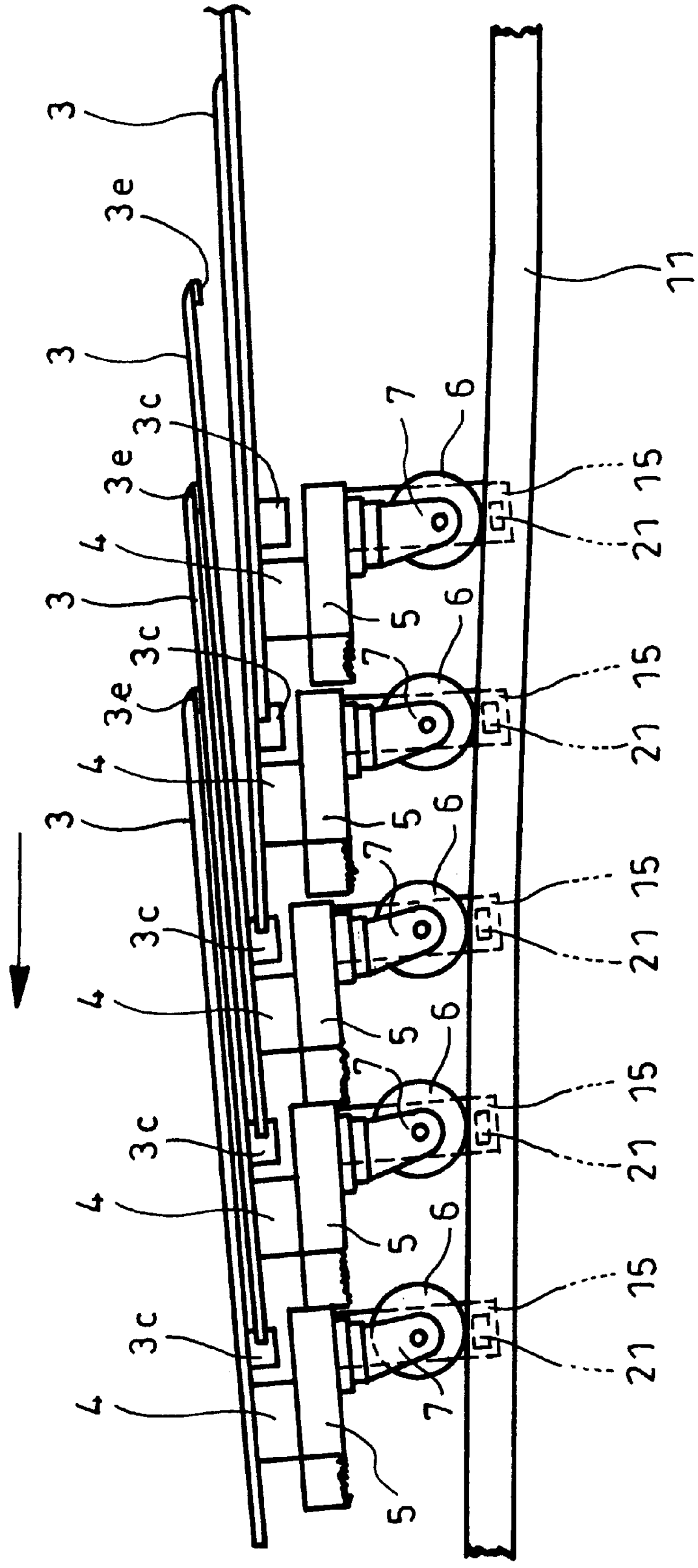
FIGS. 11 and 12 are side and plan views showing the pallets on semi-circular sectors of the rails in FIG. 9, respectively.
Figure 12:
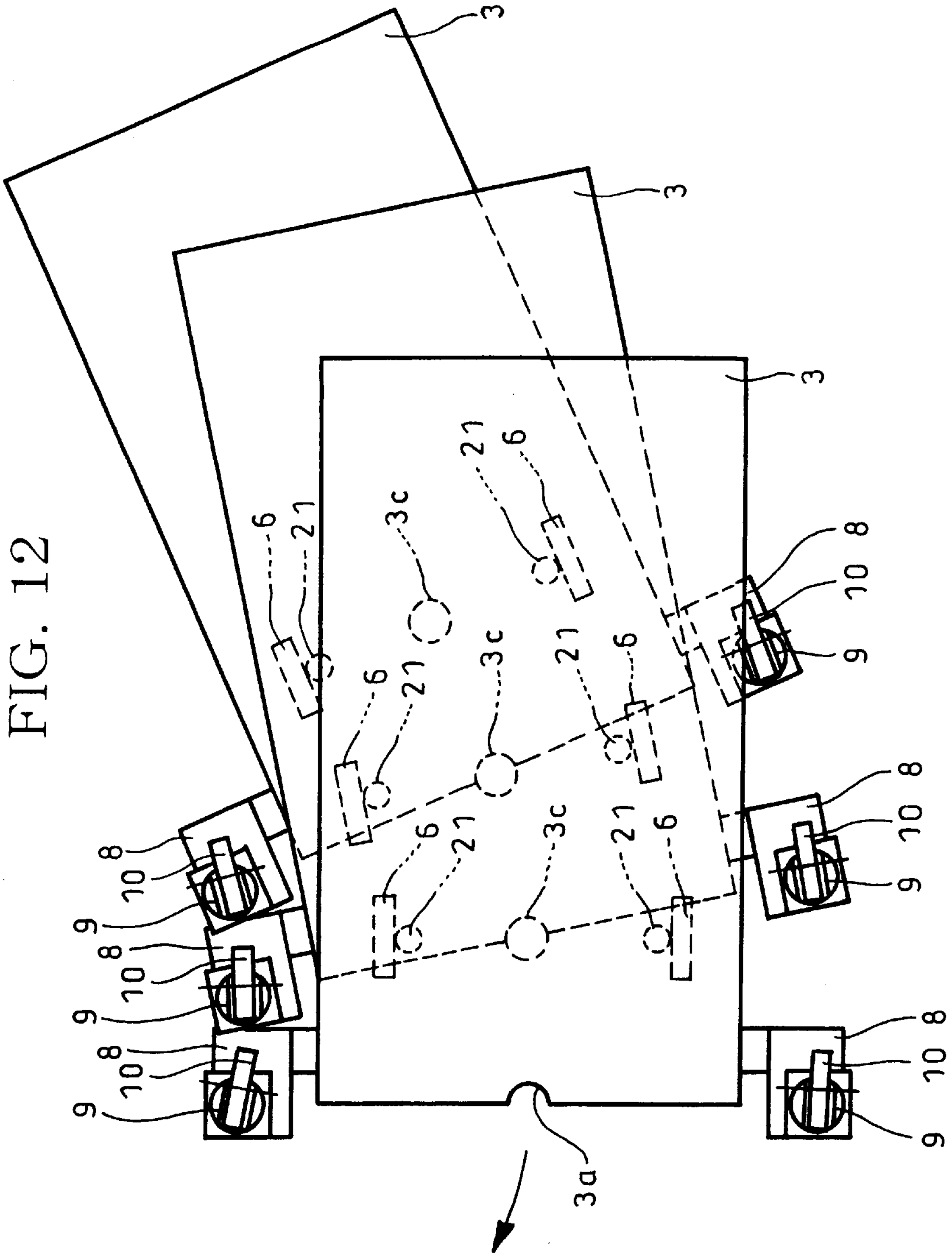
Figure 13:
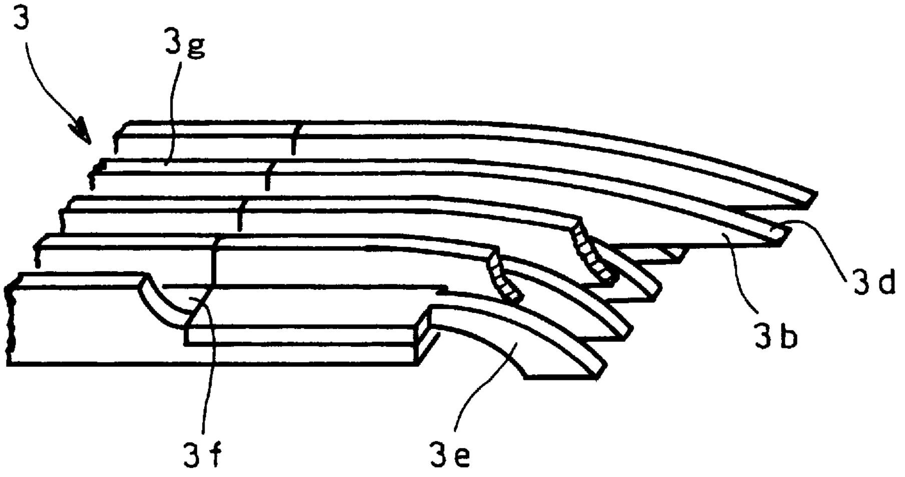
FIG. 13 is a partial perspective view showing a rear end of the pallet in FIG. 8.
Figure 14:
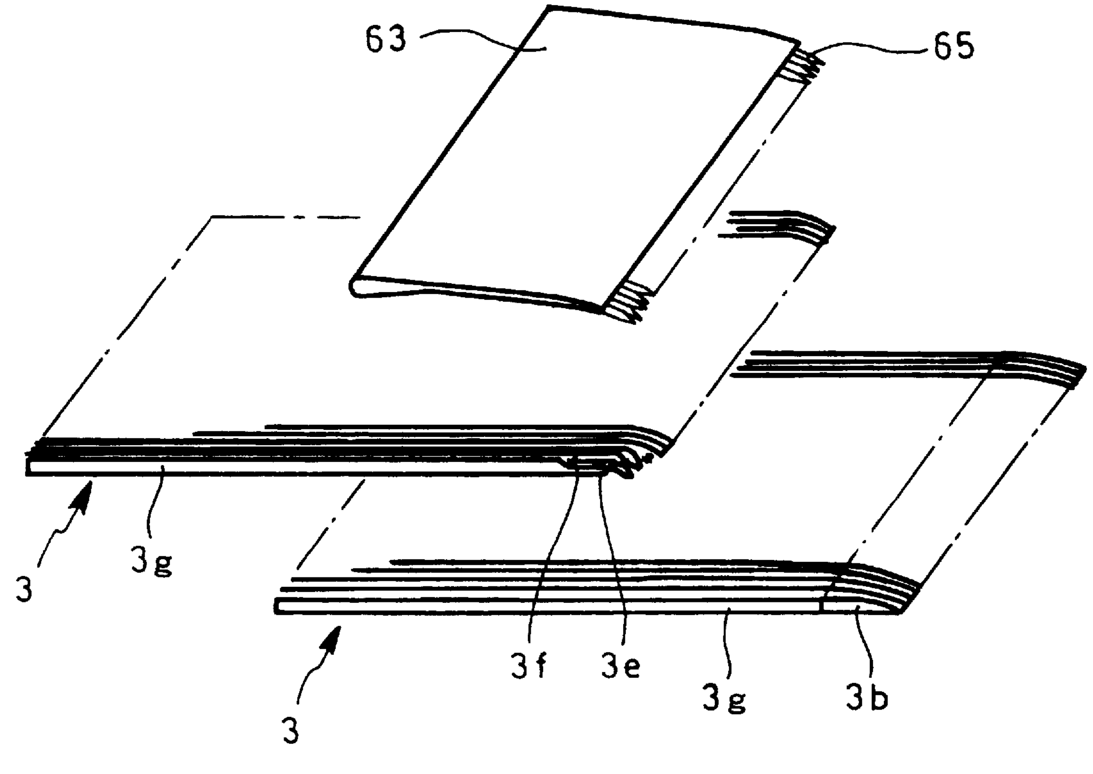
FIG. 14 is a perspective view showing the pallets and a movable step in FIG. 8.
Figure 15:
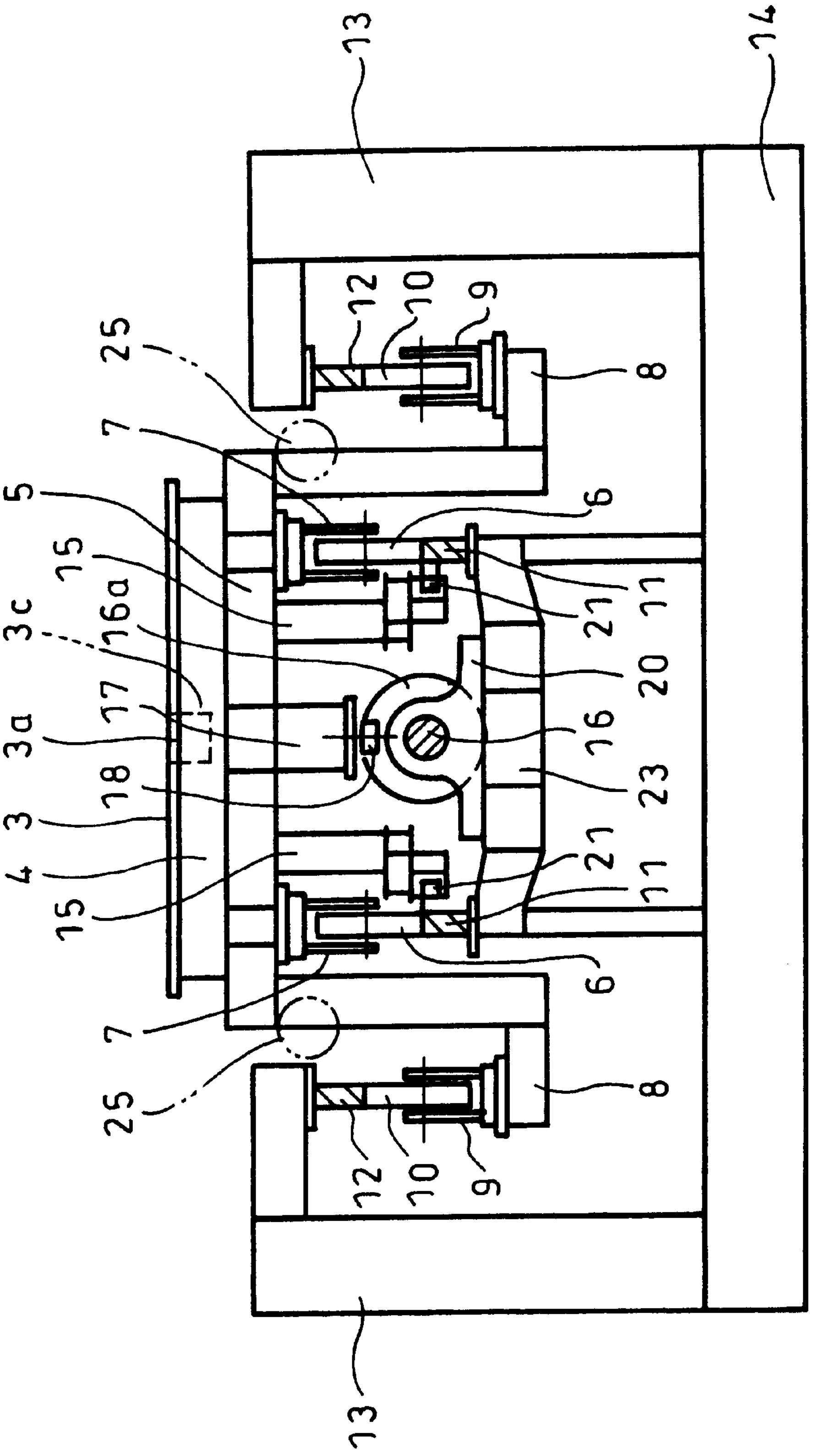
FIG. 15 is a front view showing the pallet in transition between the linear and semi-circular sectors of the rails in FIG. 9.
Figure 16:
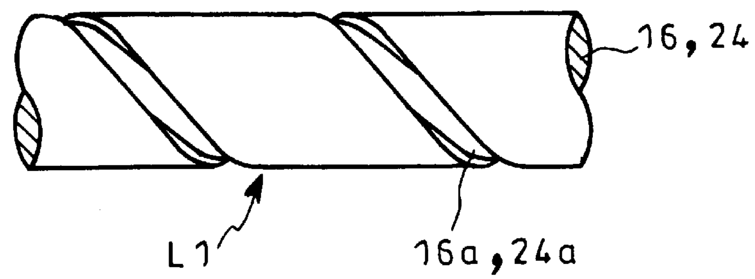
FIGS. 16 to 18 are partial side views showing portions of the screw rod different in pitch of screw groove in FIG. 6.
Figure 17:
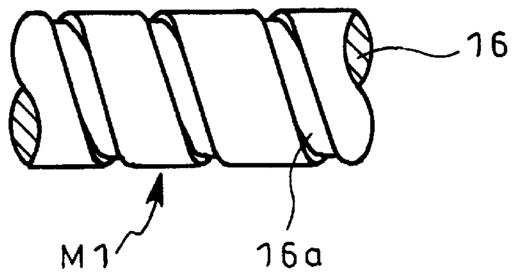
Figure 18:
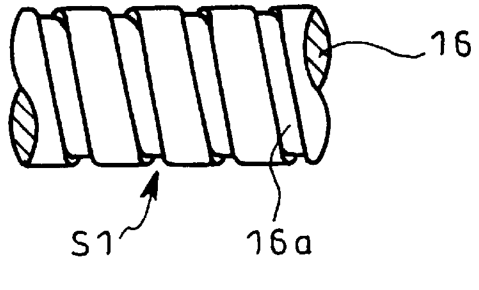

In FIG. 8, reference numerals 77S, 77M and 77L represent handrails made of rubber material.

The handrails 77S are arranged respectively on left and right of the moving route on the linear sectors 1A and 1B of the pallets 3 to correspond to the boarding sections S1 of the screw rods 16; and the handrails 77M, on left and right of the moving route of the pallets 3 to correspond to the low-speed sections M1 of the screw rods 16.

Figure 19:
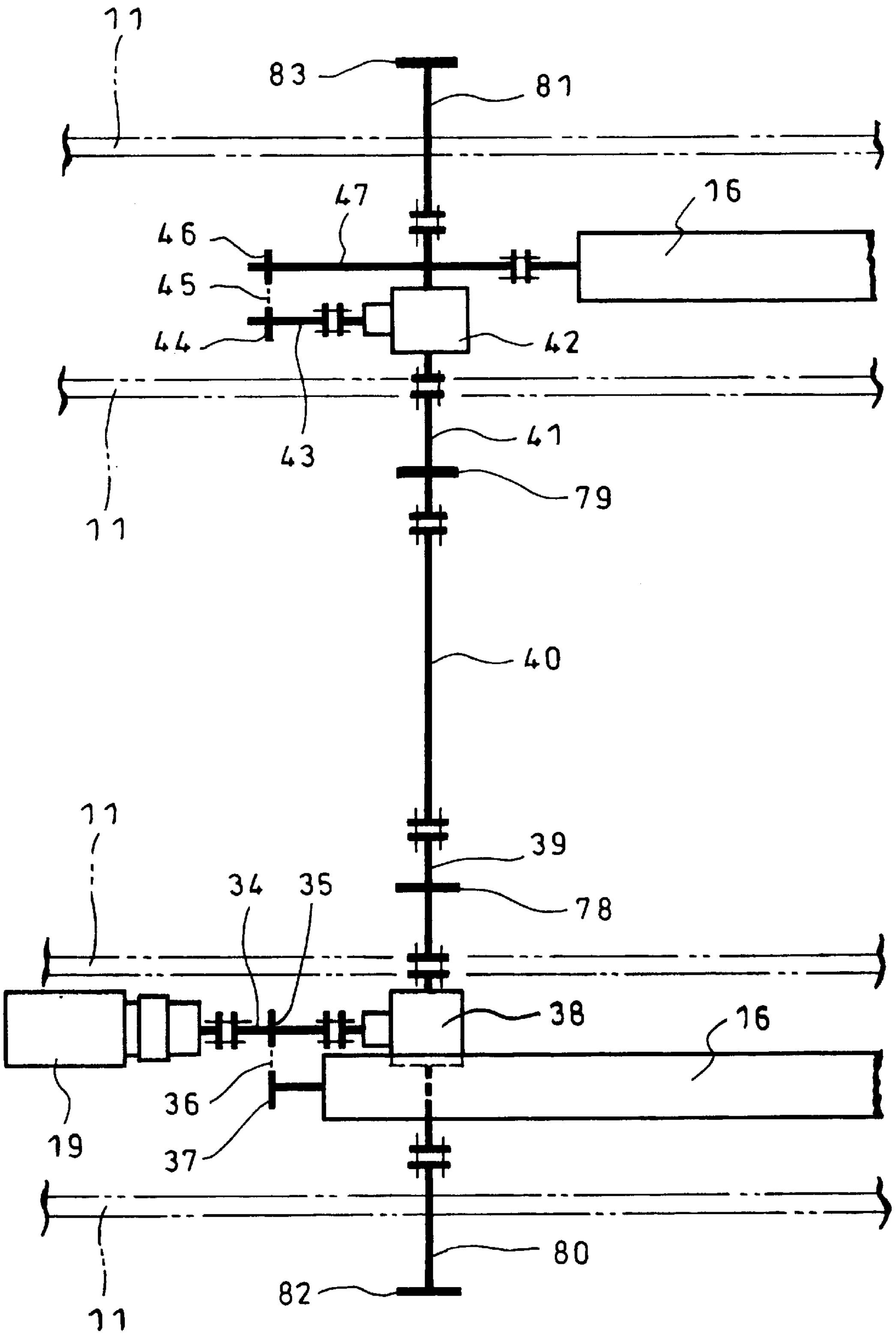
FIGS. 19 and 20 are plan views showing drive mechanisms for the screw rods in FIG. 6.

As shown in FIG. 19, the rotating power of the motor 19 is transmitted to the handrails 77S and 77M through sprockets 78 and 79 fitted respectively over the rotation shafts 39 and 41, sprockets 82 and 83 fitted respectively over rotation shafts 80 and 81 connected to the gear boxes 38 and 42, drive chains (not shown) stretched over the sprockets 78, 79, 82 and 83 and sprockets (not shown) associated with the handrails 77S and 77M. As a result, the handrails 77S and 77M are rounded or circulated in synchronization with the movement of the pallets 3.

The handrails 77L are arranged respectively at left and right of the moving route in the linear sectors 1A and 1B of the pallets 3 to correspond to sections where the handrails 77S and 77M are not arranged.

Figure 20:
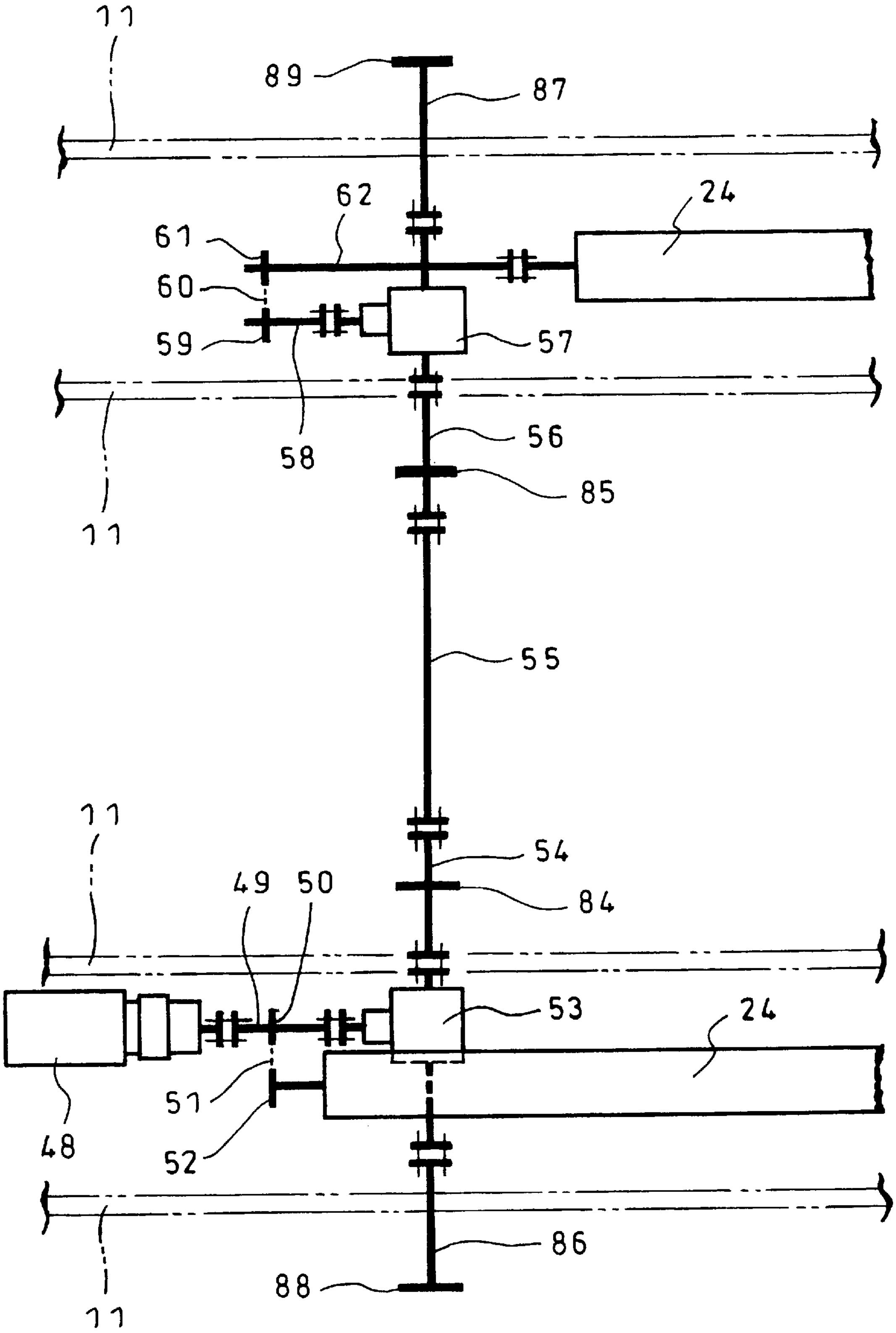
Figure 21:
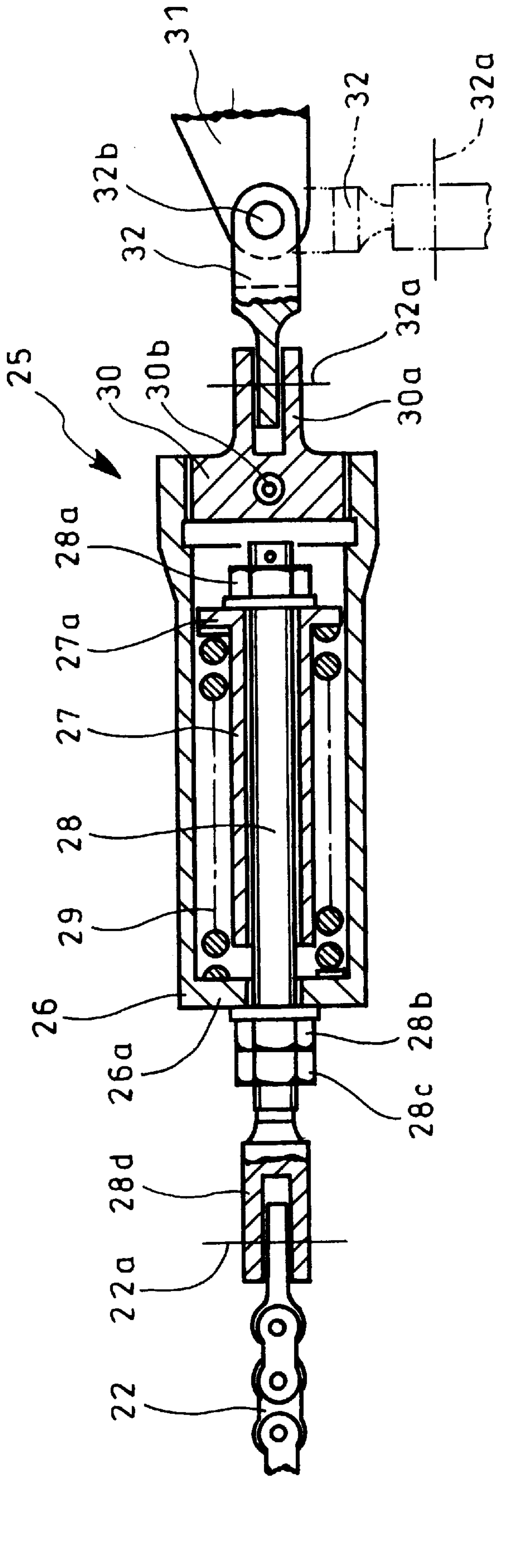
FIG. 21 is a partial sectional side view showing elastic buffer means in FIG. 10.
Figure 22:
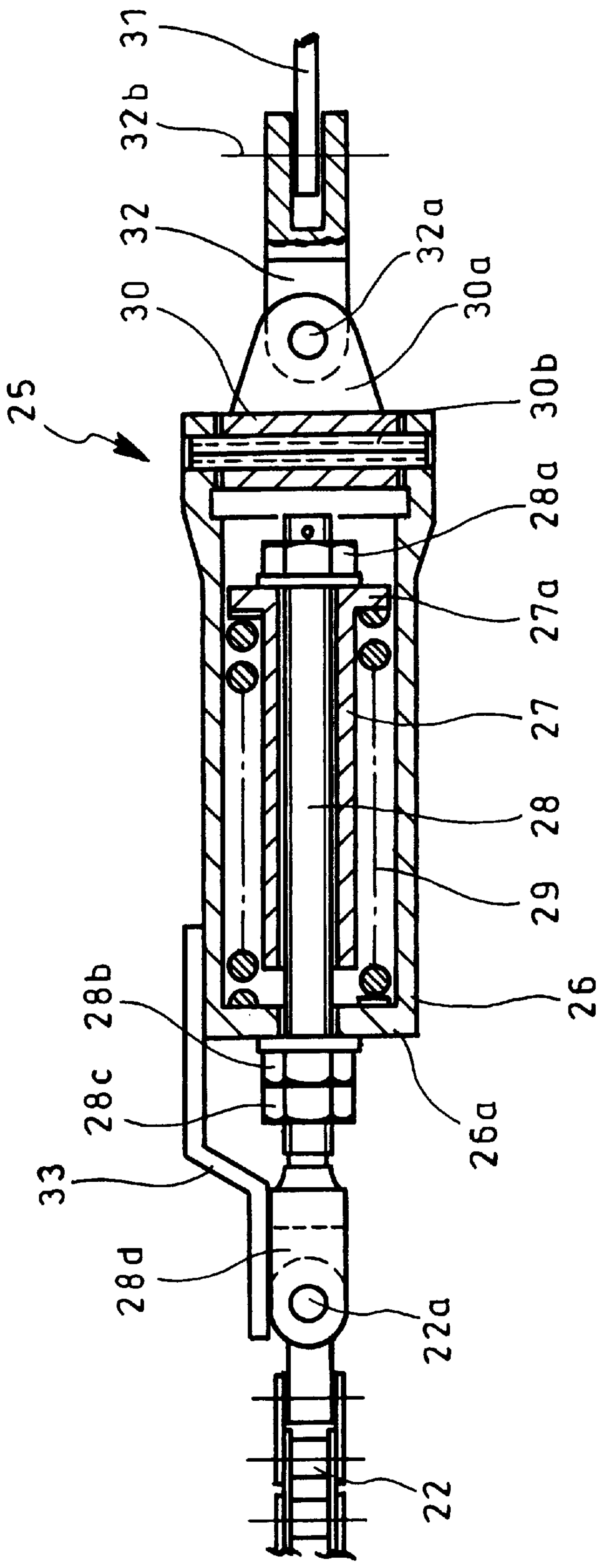
FIG. 22 is a partially sectional plan view showing spring means in FIG. 10.
Figure 23:
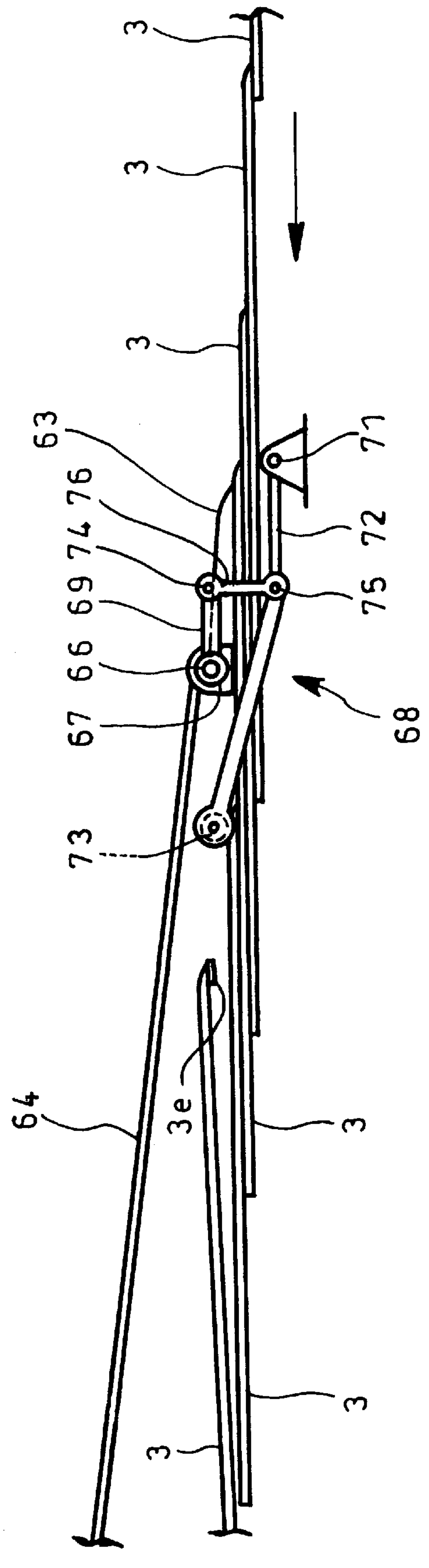
FIG. 23 is a side view showing the movable step and the pallets in FIG. 8.
Figure 24:
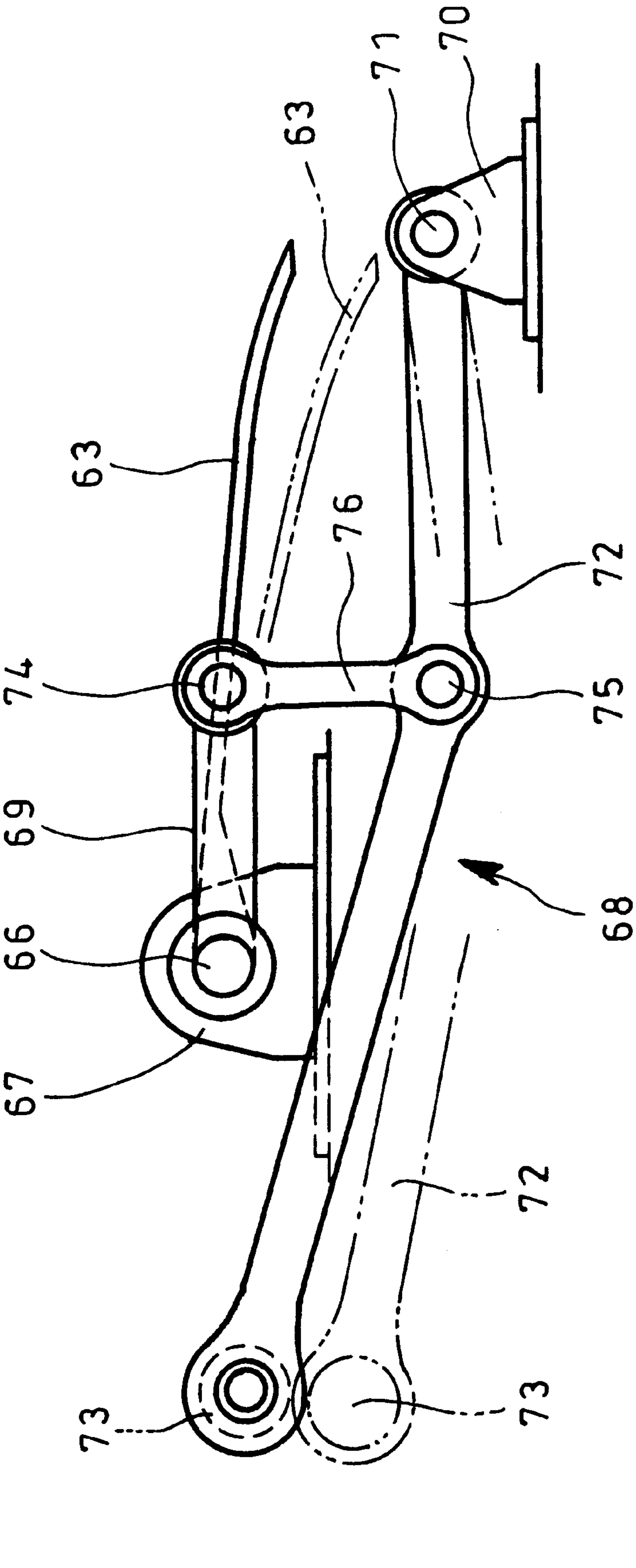
FIGS. 24 and 25 are side and partial plan views showing tracer means in FIG. 23, respectively.
Figure 25:
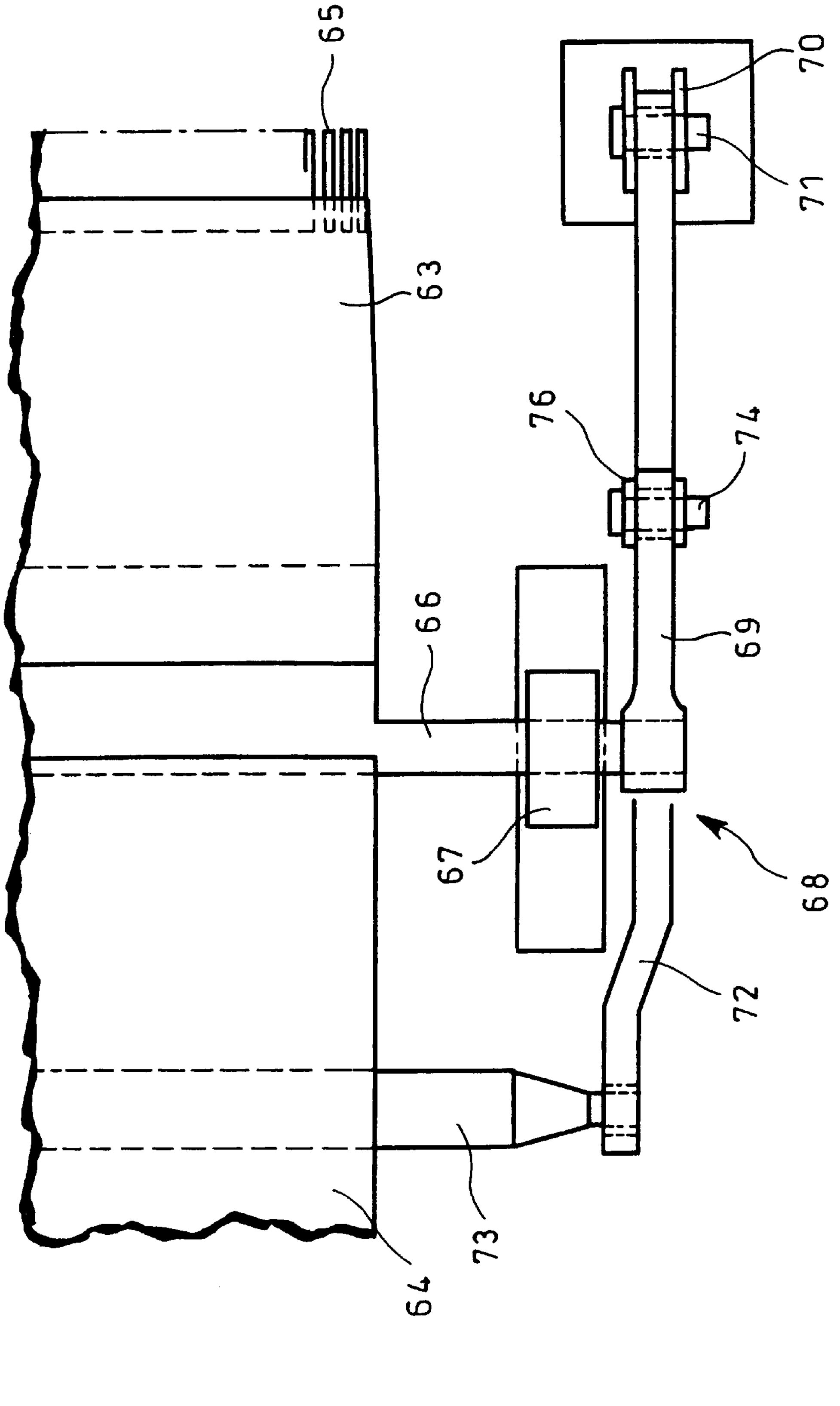

As shown in FIG. 20, rotating power of the motor 48 is transmitted to the handrails 77L through sprockets 84 and 85 respectively fitted over the rotation shafts 54 and 56, sprockets 88 and 89 respectively fitted over rotation shafts 86 and 87 connected to the gear boxes 53 and 47, drive chains (not shown) stretched over the sprockets 84, 85, 88 and 89 and sprockets (not shown) associated with the handrails 77L. As a result, the handrails 77L are rounded or circulated in synchronization with the movement of the pallets 3.

Next, mode of operation of the moving walk as shown in FIGS. 6 to 25 will be described.

In this embodiment, rotation of the screw rods 16 and 24 by the motors 19 and 48 causes the moving rollers 18 in engagement with the screw grooves 16*a* and 24*a* to be sent in a direction to correspond to the rotation of the screw rods 16 and 24, which moves the pallets 3 along the linear sectors 1A and 1B of the rails 11.

In this case, the moving directions of the pallets 3 on the linear sectors 1A and 1B of the rails 11 are mutually reversed. Thus, users can be transported in two opposite directions at the same time by the single moving walk.

Among the pallets 3 on the linear sectors 1A and 1B of the rails 11, those pallets 3 having the moving rollers 18 not in engagement with the screw grooves 16*a* and 24*a* are pulled via the elastic buffer means 25 and the chains 22 by the preceding pallets 3 which are moving in association with the rotation of the screw rods 16 and 24.

Thus, on the linear sectors 1A and 1B of the rails 11, each pallet 3 is moved with its projections 3*e* engaged in the grooves 3*f* of its succeeding pallet 3.

In this case, the rear end of the pallet 3 is overlapped with the front end of its succeeding pallet 3. Thus, many users can be transported in safe manner.

The moving speed of the pallets 3 is sequentially increased as the moving rollers 18 are moved to the boarding section S1, the low-speed section M1 and the high-speed section L1 of the screw grooves 16*a*, and is decreased as the moving rollers 18 are move to the high-speed section L1, the low-speed section M1 and the boarding section SI of the screw grooves 16*a*.

Consequently, at the opposite ends of the linear sectors 1A and lB of the rails 11, the pallets 3 are moved at low speed and users can easily get on or get off the pallets 3. At the middles of the linear sectors 1A and 1B of the rail 11, the pallets 3 where the users are on can be moved at high speed.

Any excessive tensile force may be applied to the chains 22 between the adjacent pallets 3 when each pallet 3 is started to be pulled by its preceding pallet 3. Such possible excessive tensile force is relieved by the elastic buffer means 25.

As a result, deformation of the chains 22 which may be caused by repeated application of excessive tensile force is prevented to alleviate any impact on users riding on the pallets 3.

In addition to the screw rods 16, screw rods 24 are arranged at the middles of the linear sectors 1A and 1B of the rails 11. Accordingly, any tensile force applied on the chains 22 can be further decreased, which makes it possible to design the linear sectors 1A and 1B of the rails 11 longer in length.

Relieve of the tensile force applied to the chains 22 will suppress any elongation of links which constitute the chains 22 and any wear of pins interconnecting the links.

When the pallets 3 approach the portion of the linear sectors 1A of the rails 11 closer to the semi-circular sectors 1D or to the portion of the linear sectors 1B of the rails 11 closer to the circular sectors 1C, the overlapped amount of the rear and front ends of the adjacent pallets 3 is increased due to the difference of the pitches of the high-speed section L1, the low-speed section M1 and the boarding section S1 of the screw grooves 16*a* to decrease the distance between the pallets 3.

When the pallets 3 enter the circular sectors 1C or 1D of the rails 11 after passing immediately under the movable step 63, the comb teeth 65 at the tip end of the movable step 63 are fitted in the grooves 3*f* of the pallet 3 to remove any foreign objects in the grooves 3*f*.

In this case, the tracer means 68 vertically move the movable step 63 in accordance with the upper surface of the preceding pallet 3 so as to prevent the lower surface of the comb teeth 65 from being contacted by the bottom of the grooves 3*f*, which contributes to prevention of wear of the comb teeth 65.

When the pallets 3 enter the linear sectors 1A or 1B after passing immediately under the movable step 63 from the circular sectors 1C or 1D of the rails 11, the tracer means 68 vertically move the movable step 63 in accordance with the upper surface of the succeeding pallet 3 which is moving behind of the pallet 3 with its grooves 3*f* engaged with the comb teeth 65, which contributes to prevention of wear of the comb teeth 65.

When the pallets 3 enter the circular sectors 1C or 1D of the rails 11, the tilt-angle compensation rollers 10 begin to roll over the lower surfaces of the guide rails 12 to tilt the pallet 3 forwardly so that the rear end of the pallet 3 jumps away from the front end of its succeeding pallet 3 and the projections 3*e* of the pallet 3 are disengaged from the grooves 3*f* of its succeeding pallet 3, which enables the pallets 3 to pass through the semi-circular sectors 1D or 1C of the rails.

Over the projection member 3*c* of the pallet 3, the recess 3*a* on the front end of its succeeding pallet 3 is fitted. Thus, the pallets 3 on the semi-circular sectors 1C or 1D are sequentially moved toward the linear sectors 1A or 1B as these are pushed by the pallets 3 sent by the screw rod 16 from the linear sectors 1B or 1A.

When the pallets 3 are moved from the semi-circular sectors 1C or 1D of the rails 11 to the linear sectors 1A or 1B, the tilt-angle compensation rollers 10 cease rolling over the lower surfaces of the guide rails 12 to release the forward tilting of the pallet 3. Accordingly, the rear end of each pallet 3 is overlapped with the front end of its succeeding pallet 3 and the projections 3*e* of the pallet 3 are re-engaged with the grooves 3*f* of the succeeding pallet 3.

As described above, according to the moving walk shown in FIGS. 6 to 25, users can be safely transported in opposite two directions.

Figure 26:
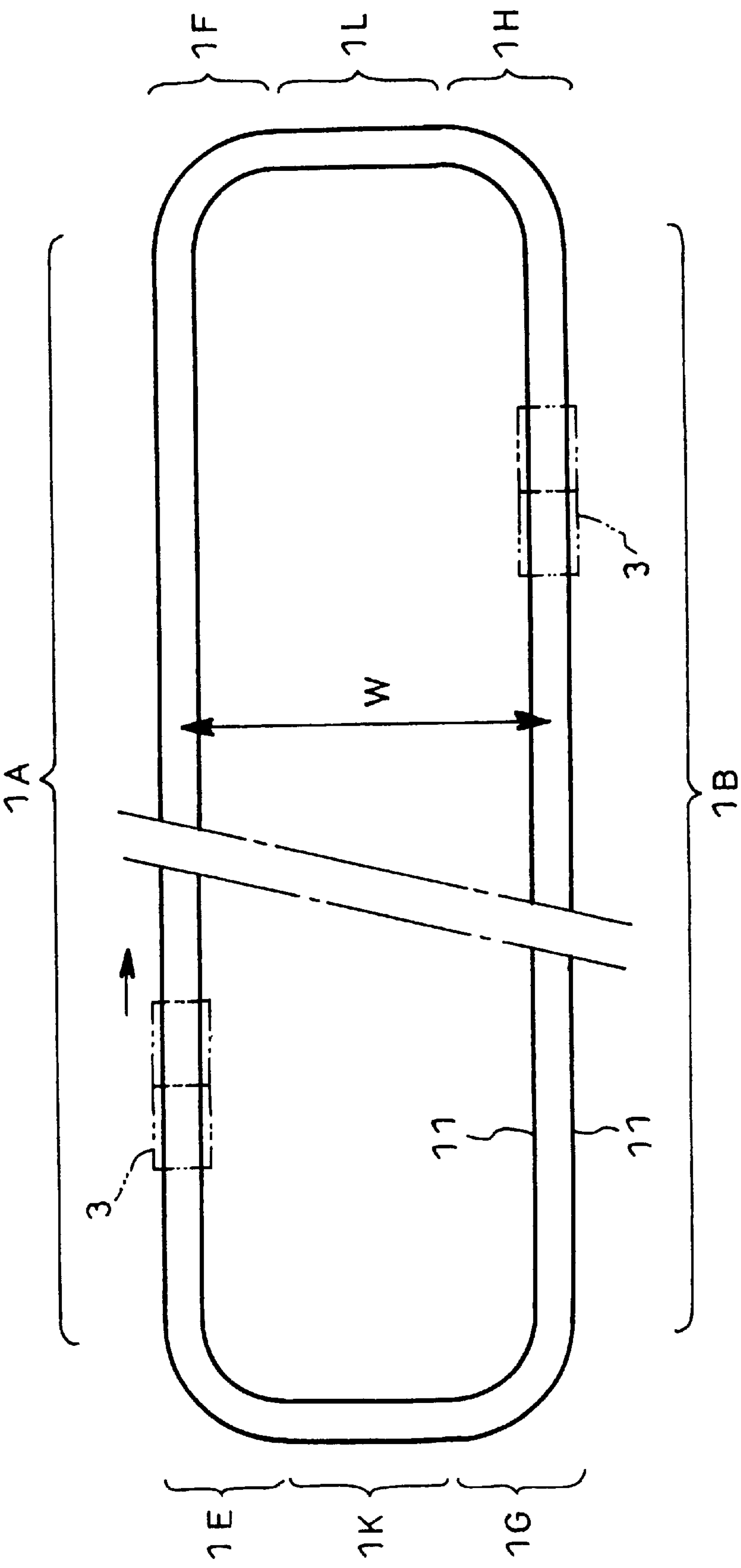
FIG. 26 is a plan view showing another embodiment of rail arrangement used in the moving walk of the invention.

FIG. 26 shows a further embodiment of the arrangement of the rails 11 to be used in the moving walk of the invention. Each rail 11 comprises two linear sectors 1A and 1B arranged horizontally and in parallel with each other, quadrant sectors 1E, 1F, 1G and 1H continuous to the respective ends of the linear sectors 1A and 1B, short linear sectors 1K continuous at their opposite ends to the quadrant sectors 1E and 1G, and short linear sectors 1L continuous at their opposite ends to the quadrant sectors 1F and 1H. Thus, it is possible to increase the distance W between the long linear sectors 1A and 1B of the rails 11 where the pallets 3 are transported in different directions.

It is to be understood that the moving walk according to the invention is not limited to the above embodiments and that various changes and modifications may be made without departing from the scope of the invention.

For example, in a case where the linear sectors 1A and 1B of the rails 11 are not long, the screw rods 16 may be arranged almost over the total length of each of the linear sectors 1A and 1B to move the pallets 3.

In a case where the linear sectors 1A and 1B of the rails 11 are very long, a plurality of screw rods 24 may be installed at the intermediate portions of the linear sectors 1A and 1B to alleviate tensile force applied to the chains 22.

The elastic buffer means 25 has been described to have the spring member 29; instead, it may utilize gas pressure or liquid viscous resistance.

The elastic buffer means 25 has been described to be installed on one end of the chain 22; instead, the means 25 may be installed on each of the opposite ends of the chain 22.

Figure 6:
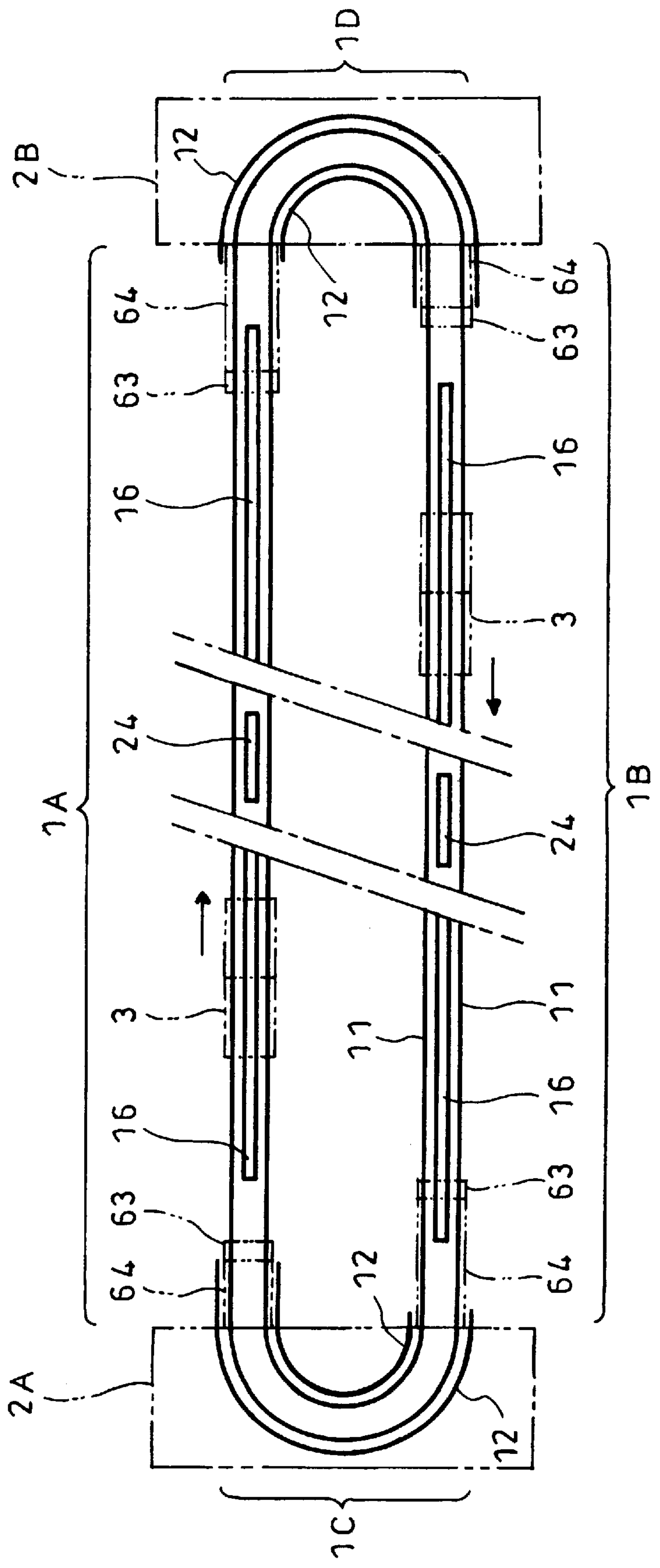
FIG. 6 is a plan view showing an embodiment of a moving walk according to the invention.
Figure 7:
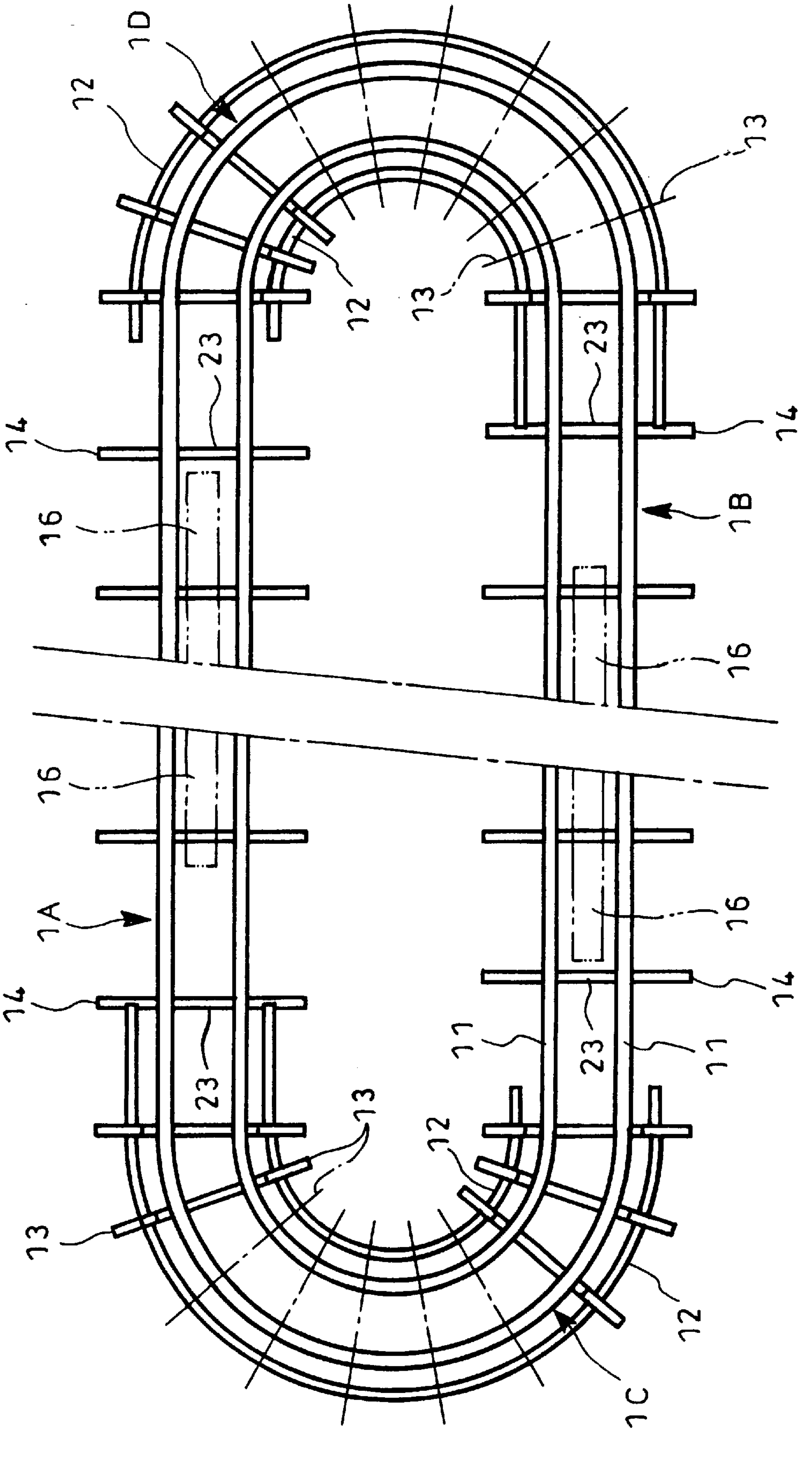
FIG. 7 is a partial plan view showing rails and guide rails in FIG. 6.

In FIGS. 6 and 7, the guide rails 12 are shown to have their ends slightly extending beyond the ends of the semi-circular sectors 1C or 1D toward the center of the linear sectors 1A or 1B; instead, the guide rails 12 may further extend toward the center of the linear sectors 1A or 1D than the positions shown in FIGS. 6 and 7, or may end short of the positions shown in FIGS. 6 and 7.

As described above, according to the moving walk of the invention, the following superb effects can be attained:

(1) In the moving walk according to any one of claims 1 to 10, a number of pallets are arranged for rounding or circulation on the annular rails each having two linear sectors. Screw rods for moving the pallets are installed on the linear sectors of the rails and the adjacent pallets are interconnected using string means. As a result, the moving direction of the pallets in linear sectors is reverse to the moving direction in further linear sectors of the rails, and users can be transported in two opposite directions at the same time by a single moving walk.

(2) Each pallet is inserted, at its front end, under the rear end of its preceding pallet to form a continuous walkway, so that a great number of users can be transported in safe manner.

(3) A recess may be provided on the front end of each pallet to be fitted over a projection member of its preceding pallet, which ensures positive engagement of the front end of each pallet with the rear end of its preceding pallet on the circular sectors of the rails.

(4) The screw rods may have screw grooves with shorter pitch at portions closer to the semi-circular sectors of the rails and with longer pitch at portions away from the semi-circular sectors, so that the moving speed of the pallets is slow at the portions of the linear sectors of the rails closer to the circular sectors, and is increased at middles of the linear sectors of the rails. Accordingly, on the portions of the linear sectors of the rails closer to the circular sectors, users can easily get on or off the pallets.

(5) Further screw rods for moving the pallets may be separately provided at the middles of the linear sectors of the rails, which can relieve any tensile force applied to the string means interconnecting the adjacent pallets.

(6) Each pallet may be provided with tilt-angle compensation rollers rollable over the lower surfaces of the guide rails which forwardly tilt the pallet moved from the linear sectors of the rails to the semi-circular sectors so that the rear end of the pallet jumps away from the front end of its succeeding pallet. This facilitates movement of the pallets on the semi-circular sectors of the rails.

(7) A step may be arranged on each of the boarding sites where users may get on or off the pallets. The step has comb teeth which may be fitted into grooves extending longitudinally on an upper surface of each pallet. This makes it possible to remove foreign objects in the grooves of the pallet by the comb teeth.

(8) The step may be vertically moved by tracer means in accordance with the upper surface of the pallet passing near the position where the step is arranged. This prevents the comb teeth from contacting the bottoms of the grooves of the pallet and therefore prevents wear of the comb teeth.

(9) Elastic buffer means may be arranged between each pallet and the string means to be connected to the pallet, which can reduce any tensile force applied to the string means when its succeeding pallet is moved after the pallet.

(10) A short linear sector may be arranged at a middle of each of the semi-circular sectors of the rails, which makes it possible to increase distance between the long linear sectors of the rails where the pallets are moved in different directions.

What is claimed is:

1. A moving walk comprising:

annular rails each having two linear sectors and two semi-circular sectors, said linear sectors and said semi-circular sectors being combined endlessly and substantially horizontally;

first screw rods rotatably arranged in parallel with said linear sectors and having screw grooves and a number of pallets to be circulated along said rails, each of said pallets having running rollers for rolling over said rails, transverse-motion control side rollers for rolling over side surfaces of said rails, and a moving roller to be engaged with said screw grooves of said first screw rods, each of said pallets having a projection member on a lower surface of said pallet so that said projection member of said pallet may contact a front end of a succeeding pallet, each of said pallets being inserted at a front end thereof under a preceding pallet, and adjacent pallets being interconnected through string means, wherein a pitch of said screw groove is shorter on a portion of each of said first screw rods closer to a first end and is longer on a portion of each of said first screw rods closer to a second end, each of said first screw rods being arranged on portions of said linear sectors of said rails closer to said semi-circular sectors so that said portion of each of said first screw rods with said pitch which is shorter in said screw groove is positioned closer to said semi-circular sectors of said rails; and second screw rods rotatably arranged on and parallel to said linear sectors of said rails between said first screw rods arranged closer to said semi-circular sectors of said rails, each of said second screw rods having a screw groove with a pitch equal to said pitch which is longer of said screw groove of said first screw rods.

2. A moving walk comprising:

annular rails each having two linear sectors and two semi-circular sectors, said linear sectors and said semi-circular sectors being combined endlessly and substantially horizontally;

screw rods rotatably arranged in parallel with said linear sectors and having screw grooves and a number of pallets to be circulated along said annular rails, each of said pallets having running rollers for rolling over said annular rails, transverse-motion control side rollers for rolling over side surfaces of said annular rails, and a moving roller to be engaged with said screw grooves of said screw rods, each of said pallets having a projection member on a lower surface of said pallet so that said projection member of said pallet may contact a front end of a succeeding pallet, each of said pallets being inserted at a front end thereof under a preceding pallet, and adjacent pallets being interconnected through string means; and guide rails arranged to extend along said semi-circular sectors of said rails and along portions of said linear sectors of said rails closer to said semi-circular sectors, each pallet being provided with tilt-angle compensation rollers which are arranged ahead of said moving roller in a moving direction of said pallet and are rollable over lower surfaces of said guide rails.

3. A moving walk comprising:

annular rails each having two linear sectors and two semi-circular sectors, said linear sectors and said semi-circular sectors being combined endlessly and substantially horizontally;

screw rods rotatably arranged in parallel with said linear sectors and having screw grooves and a number of pallets to be circulated along said rails, each of said pallets having running rollers for rolling over said rails transverse-motion control side rollers for rolling over side surfaces of said rails, and a moving roller to be engaged with said screw grooves of said screw rods, each of said pallets having a projection member on a lower surface of said pallet so that said projection member of said pallet may contact a front end of a succeeding pallet, each of said pallets being inserted at a front end thereof under a preceding pallet, and adjacent pallets being interconnected through string means, wherein each of said pallets has an upper surface formed with grooves extending longitudinally, a step with comb teeth at a tip end being arranged on each of portions of said linear sectors of said rails closer to said semi-circular sectors such that said comb teeth are fitted in said grooves of said pallet passing through said portions of said linear sectors, and a base end of said step away from said comb teeth being positioned closer to said semi-circular sectors;

a rotation shaft is attached to and extends laterally from said base end of said step, said rotation shaft being pivoted to a fixed object near said base end of said step; and tracer means being provided to vertically move said step in accordance with said upper surface of said pallet passing through said portions of said linear sectors of said rails closer to said semi-circular sectors.

4. A moving walk comprising:

annular rails each having two linear sectors and two semi-circular sectors, said linear sectors and said semi-circular sectors being combined endlessly and substantially horizontally;

screw rods rotatably arranged in parallel with said linear sectors and having screw grooves and a number of pallets to be circulated along said rails, each of said pallets having running rollers for rolling over said rails, transverse-motion control side rollers for rolling over side surfaces of said rails, and a moving roller to be engaged with said screw grooves of said screw rods, each of said pallets having a projection member on a lower surface of said pallet so that said projection member of said pallet may contact a front end of a succeeding pallet, each of said pallets being inserted at a front end thereof under a preceding pallet, and adjacent pallets being interconnected through string means, wherein each of said pallets has an upper surface formed with grooves extending longitudinally, a step with comb teeth at a tip end being arranged on each of portions of said linear sectors of said rails closer to said semi-circular sectors such that said comb teeth are fitted in said grooves of said pallet passing through said portions of said linear sectors, and a base end of said step away from said comb teeth being positioned closer to said semi-circular sectors;

a rotation shaft is attached to and extends laterally from said base end of said step, said rotation shaft being pivoted to a fixed object near said base end of said step; and tracer means being provided to vertically move said step in accordance with said upper surface of said pallet passing through said portions of said linear sectors of said rails closer to said semi-circular sectors, wherein said tracer means includes a tracer means upper arm having a tracer means upper arm base end fixed to said rotation shaft and a tracer means upper arm tip end positioned laterally of said step, a tracer means lower arm having a tracer means lower arm base end pivoted to a fixed object near said tracer means upper arm tip end of positioned laterally of said step and a tracer means lower arm tip end arranged under said tracer means upper arm so that said tracer means lower arm tip end is at a position closer to said semi-circular sectors of said rails than said rotation shaft, a tracing roller pivoted on said tracer means lower arm tip end of so that said tracing roller can roll over said upper surface of said pallet passing through said portions of said linear sectors of said rails closer to said semi-circular sectors and a connection member having a first end pivoted to said tracer means upper arm tip end and a second end pivoted to a middle of said tracer means lower arm.

5. A moving walk comprising:

annular rails each having two linear sectors and two semi-circular sectors, said linear sectors and said semi-circular sectors being combined endlessly and substantially horizontally;

screw rods rotatably arranged in parallel with said linear sectors and having screw grooves and a number of pallets to be circulated along said rails, each of said pallets having running rollers for rolling over said rails, transverse-motion control side rollers for rolling over side surfaces of said rails, and a moving roller to be engaged with said screw grooves of said screw rods, each of said pallets having a projection member on a lower surface of said pallet so that said projection member of said pallet may contact a front end of a succeeding pallet, each of said pallets being inserted at a front end thereof under a preceding pallet, and adjacent pallets being interconnected through string means, wherein each of said pallets has an upper surface formed with grooves extending longitudinally, a step with comb teeth at a tip end being arranged on each of portions of said linear sectors of said rails closer to said semi-circular sectors such that said comb teeth are fitted in said grooves of said pallet passing through said portions of said linear sectors, and a base end of said step away from said comb teeth being positioned closer to said semi-circular sectors;

a rotation shaft is attached to and extends laterally from said base end of said step, said rotation shaft being pivoted to a fixed object near said base end of said step; and tracer means being provided to vertically move said step in accordance with said upper surface of said pallet passing through said portions of said linear sectors of said rails closer to said semi-circular sectors; and elastic buffer means between each pallet and said string means to be connected to said pallet so as to reduce tensile force to be applied to said string means when said succeeding pallet is moved after said pallet.

6. A moving walk comprising:

annular rails each having two linear sectors and two semi-circular sectors, said linear sectors and said semi-circular sectors being combined endlessly and substantially horizontally;

screw rods rotatably arranged in parallel with said linear sectors and having screw grooves and a number of pallets to be circulated along said rails, each of said pallets having running rollers for rolling over said rails, transverse-motion control side rollers for rolling over side surfaces of said rails, and a moving roller to be engaged with said screw grooves of said screw rods, each of said pallets having a projection member on a lower surface of said pallet so that said projection member of said pallet may contact a front end of a succeeding pallet, each of said pallets being inserted at a front end thereof under a preceding pallet, and adjacent pallets being interconnected through string means, wherein each of said pallets has an upper surface formed with grooves extending longitudinally, a step with comb teeth at a tip end being arranged on each of portions of said linear sectors of said rails closer to said semi-circular sectors such that said comb teeth are fitted in said grooves of said pallet passing through said portions of said linear sectors, and a base end of said step away from said comb teeth being positioned closer to said semi-circular sectors;

a rotation shaft is attached to and extends laterally from said base end of said step, said rotation shaft being pivoted to a fixed object near said base end of said step; and tracer means being provided to vertically move said step in accordance with said upper surface of said pallet passing through said portions of said linear sectors of said rails closer to said semi-circular sectors; and elastic buffer means between each pallet and said string means to be connected to said pallet so as to reduce tensile force to be applied to said string means when said succeeding pallet is moved after said pallet, wherein said elastic buffer means includes a spring member loosely fitted over a bolt and to be compressed in said moving direction of said pallet, a first seat axially movably fitted over a portion of said bolt closer to a first end thereof and contacting a first end of said spring member, a first nut screwed on said bolt so that said nut contacts an end surface of said first seat away from said spring member, a second seat axially movably fitted over a portion of said bolt closer to a second end thereof and contacting a second end of said spring member, and a second nut screwed on said bolt so that said second nut contacts an end surface of said second seat away from said spring member, said elastic buffer means being associated, through said second seat and said second end of said bolt, with said pallet and said spring means.

* * * * *